United States Patent
Padmaraju et al.

(10) Patent No.: US 10,742,324 B1
(45) Date of Patent: Aug. 11, 2020

(54) BIAS CONTROL OF OPTICAL MODULATORS

(71) Applicant: Elenion Technologies, LLC, New York, NY (US)

(72) Inventors: Kishore Padmaraju, New York, NY (US); Ruizhi Shi, New York, NY (US); Yangjin Ma, Brooklyn, NY (US); Matthew Streshinsky, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/417,788

(22) Filed: May 21, 2019

(51) Int. Cl.
*H04B 10/50* (2013.01)
*G02F 1/01* (2006.01)

(52) U.S. Cl.
CPC ..... *H04B 10/50575* (2013.01); *G02F 1/0123* (2013.01); *H04B 10/5053* (2013.01)

(58) Field of Classification Search
CPC .......... H04B 10/50575; H04B 10/5053; G02F 1/0123
See application file for complete search history.

(56) References Cited

U.S. PATENT DOCUMENTS

| | | | |
|---|---|---|---|
| 5,835,212 A | 11/1998 | Kissa et al. | |
| 7,116,460 B2 | 10/2006 | Griffin | |
| 7,394,992 B2 | 7/2008 | Kimmitt et al. | |
| 7,603,007 B2 | 10/2009 | Terahara et al. | |
| 7,899,338 B2 | 3/2011 | Hashimoto et al. | |
| 8,050,351 B2 | 11/2011 | Cho et al. | |
| 8,849,129 B2 | 9/2014 | Bhandare et al. | |
| 9,116,368 B2 | 8/2015 | Kawakami et al. | |
| 2005/0213862 A1 | 9/2005 | Kawanishi et al. | |
| 2007/0212075 A1 | 9/2007 | Yin | |
| 2014/0153077 A1 | 6/2014 | Kawakami et al. | |
| 2015/0293426 A1* | 10/2015 | Balsamo | H04B 10/5053 359/279 |
| 2016/0036533 A1 | 2/2016 | Nakashima et al. | |
| 2016/0124251 A1* | 5/2016 | Zhang | G02B 6/1225 385/8 |
| 2016/0282699 A1 | 9/2016 | Gottwald et al. | |
| 2017/0285436 A1* | 10/2017 | Hochberg | B82Y 20/00 |

(Continued)

FOREIGN PATENT DOCUMENTS

WO  WO-2017/082349 A1 *  5/2017  .......... G02F 1/0123

OTHER PUBLICATIONS

Matthews et al, Manipulating multi-photon entanglement in waveguide quantum circuits (published in Nature Photonics, vol. 3, pp. 346-350, May 2009).*

(Continued)

*Primary Examiner* — Casey L Kretzer
(74) *Attorney, Agent, or Firm* — Stratford Managers Corporation

(57) ABSTRACT

A semiconductor-based Mach-Zehnder modulator (MZM) is configured for push-pull bias dithering to control the MZM bias at a desired set point. When two such MZM modulators are connected in parallel to form an IQ modulator, bias settings for both MZMs and the IQ bias may be controlled from an output of the IQ modulator to minimize both the IQ offset and the quadrature error of the output signal constellation even for non-ideal MZMs with low extinction ratios.

14 Claims, 14 Drawing Sheets

(56) References Cited

U.S. PATENT DOCUMENTS

2017/0294967 A1* 10/2017 Schmogrow ..... H04B 10/50575
2018/0173023 A1   6/2018 Streshinsky et al.
2018/0267384 A1   9/2018 Padmaraju et al.
2018/0323878 A1* 11/2018 Kawakami ........... H04B 10/516

OTHER PUBLICATIONS

Inwoong Kim et al, Mitigation and Monitoring of the Impact of Extinction Ratio of IQ-Modulator on Nyquist M-QAM Signals, IEEE Photonics Technology Letters, vol. 26, No. 2, Jan. 15, 2014, p. 177-179.
Takashi Sugihara et al, Effect of Modulator Bias Control in the Presence of a Finite Extinction Ratio in DQPSK Pre-Equalization Systems, IEEE Photonics Technology Letters, vol. 24, No. 5, Mar. 1, 2012, p. 371-373.
H. Kawakami, E. Yoshida, Y. Miyamoto, "Auto Bias Control Technique Based on Asymmetric Bias Dithering for Optical QPSK Modulation," IEEE Journal of Lightwave Technology, 30(7), Apr. 1, 2012.
P. S. Cho, J. B. Khurgin, I. Shpantzer, "Closed-Loop Bias Control of Optical Quadrature Modulator," IEEE PTL, 18(21), Nov. 1, 2006.
Diedrik Vermeulen et al, Demonstration of Silicon Photonics Push-Pull Modulators Designed for Manufacturability, IEEE Photonics Technology Letters, vol. 28, No. 10, May 15, 2016, p. 1127-1129.
Xiaolei Li at al, Modulation-format-free and automatic bias control for optical IQ modulators based on dither-correlation detection, vol. 25, No. 8 | Apr. 17, 2017 | Optics Express 9333.
Tao Gui et al, Auto bias control technique for optical OFDM transmitter with bias dithering, Mar. 11, 2013 / vol. 21, No. 5 / Optics Express 5833.

* cited by examiner

US 10,742,324 B1

BIAS CONTROL OF OPTICAL MODULATORS

FIELD OF THE INVENTION

The invention generally relates to optical modulators, and more particularly relates to bias control of an optical modulator.

BACKGROUND OF THE INVENTION

Optical waveguide modulators used in high-speed optical communications, such as those based on a Mach-Zehnder (MZ) interferometer (MZI), may be implemented in a photonic chip in the form of a photonic integrated circuit (PIC). The photonic chip may be based on a semiconductor material such as silicon (Si), indium phosphate (InP), or the like, which enables to utilize well-developed semiconductor manufacturing technologies and approaches to transmission and control of optical signals and high-speed electrical signals. An MZI-based waveguide modulator may require active control of their bias setting, which determines at which point of a transmission transfer characteristic the MZI operates during modulation. The bias setting of an MZI may be controlled by varying a refractive index of a waveguide arm of the MZI to control a relative phase of interfering light waves in the MZI in the absence of modulation signals.

Very high speed optical systems may benefit from using advanced quadrature modulation (QM) formats such quadrature phase shift keying (QPSK) or quadrature amplitude modulation (QAM). Optical QM signals may be obtained using an optical IQ modulator, which may be implemented using nested MZI structures. Such structures typically require controlling several bias voltages. For example, a QPSK optical signal may be generated by combining two BPSK (binary phase shift keying) optical signals in quadrature, i.e. with a phase shift therebetween $\phi_{IQ}$ equal to 900, or $\pi/2$ radians (rad). The optical signals being combined, conventionally referred to as the in-phase (I) and quadrature-phase (Q) signals, may be generated by splitting light from a suitable light source between two MZ modulators (MZM) driven by two NRZ electrical data signals, conventionally referred to as the "I" and "Q" electrical data signals, and then combining their outputs in quadrature. An optical BPSK signal may be generated by applying a binary AC electrical modulation signal to an ideal MZM that is biased at its minimum transmission point. When optical outputs of two such MZMs are coherently added together in quadrature, a QPSK optical signal results.

In semiconductor-based optical modulators, the biasing is typically done using resistive heaters disposed to locally heat a portion of a waveguide arm of a respective inner MZM or outer MZM, and is controlled by superimposing a small AC dither signal over a DC bias voltage and sensing a dither signature in an optical output. The bias settings of the two inner MZMs may be controlled by monitoring respective dither signals at the output of the inner MZMs or at the output of the IQ modulator, with the latter typically being a preferred choice as it allows simplifying the control circuitry. The drift of a bias voltage $V_{IQ}$ that controls the IQ phase shift $\phi_{IQ}$ in the outer MZM away from its optimal setting may also be monitored based on a feedback from the modulator's output. However, the output optical signal may be distorted when conventional dither-based techniques of bias monitoring are applied for non-ideal semiconductor-based MZMs characterized by a finite extinction ratio (ER).

SUMMARY OF THE INVENTION

An aspect of the present disclosure relates to an optical modulator device comprising: a first Mach-Zehnder modulator (MZM) formed in a photonic chip comprising semiconductor material, and an electrical circuit configured to control a bias setting of the first MZM using push-pull dithering. The first MZM may comprise a first waveguide arm and a second waveguide arm, both formed at least in part in the semiconductor material, one or more signal electrodes electrically coupled to at least one of the first and second waveguide arms, a first bias tuner coupled to the first waveguide arm, and a second bias tuner coupled to the second waveguide arm. The electrical circuit may be operatively coupled to the first and second bias tuners and configured to facilitate a push-pull dither of the bias setting of the first MZM in response to one or more bias dither signals.

An aspect of the present disclosure relates to an optical modulator system comprising: a first MZM comprising first and second waveguide arms formed in a semiconductor material; one or more signal electrodes coupled to the first and second waveguide arms to effect signal modulation of output light of the first MZM; one or more bias tuners coupled to at least one of the first and second waveguide arms for controlling a bias setting of the first MZM. A control circuit may further be configured to provide a bias signal to the one or more bias tuners, apply a push-pull dither signal to the one or more signal electrodes or the one or more bias tuners so as to effect push-pull dithering of the bias of the first MZM, detect a signature of the push-pull dither signal in an optical signal downstream of the first MZM to provide a dither feedback signal, and tune the bias signal in dependence on the dither feedback signal.

An aspect of the present disclosure relates to a method for controlling an optical modulator circuit comprising an MZM, the MZM comprising first and second waveguide arms formed in a semiconductor material, the method comprising: a) applying a bias dither signal to the first and second waveguide arms in a push-pull manner so as to dither a refractive index in the first and second waveguide arms of the MZM in counter-phase; b) detecting a signature of the bias dither signal in an output optical signal of the optical modulator; and, c) tuning a bias setting of the MZM in dependence on the detected signature of the bias dither signal.

An aspect of the present disclosure relates to a method of controlling a bias of an inner MZM of an IQ modulator fabricated in a semiconductor material, the method comprising: applying a push-pull dither signal to both arms of the inner MZM; and, tuning the bias of the inner MZM so as to minimize a signature of the push-pull dither signal in an output optical signal of the IQ modulator.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
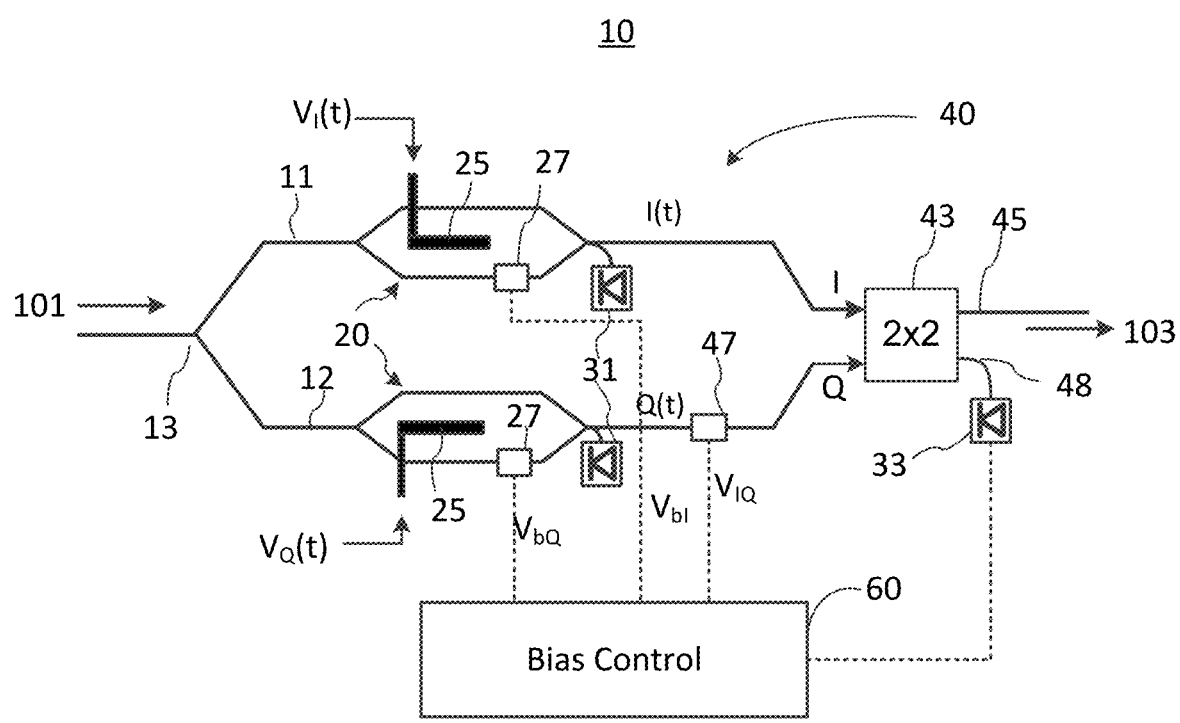
FIG. 1 is a schematic diagram of an optical quadrature modulator in the form of a nested MZM having bias tuners in one arm of each inner MZM.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

GaAs Gallium Arsenide
InP Indium Phosphide
LiNO$_3$ Lithium Niobate
PIC Photonic Integrated Circuit
SOI Silicon on Insulator
PSK Phase Shift Keying
BPSK Binary Phase Shift Keying
QAM Quadrature Amplitude Modulation
QPSK Quaternary Phase Shift Keying
PAM Pulse Amplitude Modulation
QM Quadrature Modulator
RF Radio Frequency
AC Alternate Current
DC Direct Current In the following description, the term "light" refers to electromagnetic radiation with frequencies in the visible and non-visible portions of the electromagnetic spectrum. The term "optical" relates to electromagnetic radiation in the visible and non-visible portions of the electromagnetic spectrum. The terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The term "coupled" encompasses both direct and indirect coupling, unless explicitly stated otherwise. Similarly the term "connected" encompasses both direct and indirect connections, unless explicitly stated otherwise. The terms "quadrature modulator" and "IQ modulator" may be used herein interchangeably to refer to an optical modulator in which two modulated optical signals, commonly referred to as the "in-phase" (I) signal and "quadrature-phase" (Q) signal, are combined in quadrature, i.e. with a 900 phase shift.

One aspect of the present disclosure relates to an MZM-based optical waveguide modulator that uses one or more electrical bias signals to control its operating set point, or bias. Electrical bias signals that are used to control the modulator bias or set-point may include DC and AC components, with the AC components referred to as the bias dither signal or simply as the (bias) dither. In example embodiments described below, the bias signals may be in the form of bias voltages, which may be denoted Vb. In operation the modulator may experience changes in some of its properties, for example due to temperature variations, device aging, impurity drift, etc. These changes may cause an optimal value of the DC bias voltage to drift. This drift may be assessed by monitoring a signature of the bias dither in the output optical signal of the modulator. An aspect of the present disclosure relates to the use of a push-pull bias dither in optical waveguide modulators including MZMs formed in semiconductor materials such as, but not exclusively, silicon. An aspect of the present disclosure relates to the use of a push-pull bias dither in MZMs with uni-directional bias tuners. An aspect of the present disclosure relates to use a push-pull bias dither in MZMs with uni-directional bias tuners operating at a non-zero voltage offset. An aspect of the present disclosure relates to using a push-pull dither of an MZM bias without relying on a linear electro-optic effect in a material where the MZM is implemented. In some implementations, phase shifters based on resistive heaters thermally coupled to the waveguide arms of the MZM may be used to provide bias tuners. In some implementations, the bias tuners may be in the form of non-Ohmic, linearized resistive heaters. In some implementations, phase shifters based on p/n junctions formed in the waveguide arms of the MZM may be used to provide one or more bias tuners.

An aspect of the present disclosure relates to using a push-pull bias dither in semiconductor-based optical IQ modulators with bias tuners formed with one or more resistive heaters. In some implementations, a resistive heater may comprise a sequence of doped resistive regions of a semiconductor material spread along a length of a corresponding waveguide arm and separated by undoped or less-doped regions of the semiconductor material. In some implementations, a resistive heater may be configured to have a sub-linear I-V characteristic in an operating voltage range of the at least one of the bias tuners of the MZM. In some implementations, the sub-linear IV characteristic may correspond to a differential resistance dV/dI that rises at least by a factor of 3 across the operating voltage range of the resistive heater, or by a factor of 5 or more in some implementations. In some implementations, a resistive heater may comprise two conducting regions spaced by a resistive gap of width l that satisfies the equation $$l < \frac{0.3 \cdot Vcc}{E_s},$$

where the Vcc is a rail voltage of the photonic chip implementing the IQ modulator, and $E_s$ is a saturation electrical filed of the semiconductor material. In some implementations, for example where the semiconductor material of the resistive heater comprises silicon, the width l of the resistive gap may be equal or smaller than 1.4 µm, or equal or smaller than 1 µm.

An aspect of the present disclosure relates to an optical modulator device comprising a first MZM formed in a photonic chip comprising semiconductor material, and an electrical circuit configured to control a bias setting of the first MZM using push-pull dithering. The first MZM may comprise a first bias tuner coupled to a first waveguide arm of the first MZM, and a second bias tuner coupled to a second waveguide arm of the first MZM. The electrical circuit may be operatively coupled to the first and second bias tuners and configured to facilitate a push-pull dither of the bias setting of the first MZM in response to one or more bias dither signals.

In some implementations, the electrical circuit may comprise a high-voltage terminal, a low voltage terminal, and a bias control terminal, with the first bias tuner electrically connected between the high-voltage terminal and the bias control terminal, and the second bias tuner electrically connected between the bias control terminal and the low-voltage terminal, so as to effect the push-pull dither of the bias setting of the first MZM with a common bias dither signal applied to the bias control terminal.

In some implementations, a second MZM may be connected optically in parallel with the first MZM to form an optical IQ modulator, wherein the second MZM comprises two waveguide arms operatively coupled to two bias tuners configured for push-pull bias dither of a bias setting of the second MZM.

An aspect of the present disclosure relates to an optical modulator system comprising a first MZM coupled to a bias control circuit that is configured to control a bias setting of the first MZM using push-pull bias dithering. The first MZM comprises first and second waveguide arms formed in a semiconductor material, one or more signal electrodes coupled to the first and second waveguide arms to effect signal modulation of output light of the first MZM, and one or more bias tuners coupled to at least one of the first and second waveguide arms for controlling a bias setting of the first MZM. The control circuit may be configured to: a) provide a bias signal to the one or more bias tuners, b) apply a push-pull dither signal to the one or more signal electrodes or the one or more bias tuners so as to effect push-pull dithering of the bias of the first MZM, c) detect a signature of the push-pull dither signal in an optical signal downstream of the first MZM to provide a dither feedback signal, and d) tune the bias signal in dependence on the dither feedback signal.

In some implementations, the control circuit may be configured to provide the push-pull dither signal to the one or more signal electrodes. In some implementations, the control circuit may be configured to provide the push-pull dither signal to the one or more bias tuners. In some implementations, the one or more bias tuners may comprise a first bias tuner coupled to the first waveguide arm and configured to tune the bias of the first MZM by tuning a refractive index in the first waveguide arm, and a second bias tuner coupled to the second waveguide arm and configured to tune the bias of the first MZM by tuning a refractive index in the second waveguide arm, and the control circuit may be configured to provide the push-pull dither signal to the first and second bias tuners.

In some implementations, the control circuit may comprise a high-voltage terminal, a low voltage terminal, and a bias control terminal, wherein the first bias tuner is electrically connected between the high-voltage terminal and the bias control terminal, and the second bias tuner is electrically connected between the bias control terminal and the low-voltage terminal, so as to effect the push-pull dither of the bias setting of the first MZM with a common bias dither signal applied to the bias control terminal.

In some implementations, the optical modulator system may further comprise a second MZM connected optically in parallel with the first waveguide MZM to form an optical IQ modulator, and the control circuit may comprise a photodetector (PD) disposed to receive light from an output of the optical IQ modulator and to provide an electrical PD signal, and a dither detector circuit configured to detect the signature of the push-pull dither signal in the electrical PD signal, or a signal related thereto.

An aspect of the present disclosure relates to a method for controlling an optical modulator circuit comprising an MZM having first and second waveguide arms formed in a semiconductor material, the method comprising: applying a bias dither signal to the first and second waveguide arms in a push-pull manner so as to dither a refractive index in the first and second waveguide arms of the MZM in counter-phase; detecting a signature of the bias dither signal in an output optical signal of the optical modulator; and, tuning a bias setting of the MZM in dependence on the detected signature of the dither signal.

In some implementations of the method, the MZM may comprise one or more signal electrodes coupled to the first and second waveguide arms to effect a push-pull modulation of light propagating in the first and second waveguide arms, and one or more bias tuners coupled to at least one of the first and second waveguide arms for controlling the bias setting of the MZM, and the method may comprise applying the bias dither signal to the one or more signal electrodes. In some implementations of the method wherein the MZM comprises a first bias tuner coupled to the first waveguide arm, and a second bias tuner coupled to the second waveguide arm, the method may comprise applying the bias dither signal to the first and second bias tuners. In some implementations applying the bias dither signal may comprise one of: applying an oscillatory voltage signal to a common electrical contact of the first and second bias tuners to vary refractive indices thereof in counter-phase, or applying separate counter-phase oscillatory voltage signals to the first and second bias tuners to vary refractive indices thereof in counter-phase. In some implementations wherein at least one of the first and second bias tuners comprises a resistive heater, the method may comprise operating the resistive heater in a current saturation regime.

An aspect of the present disclosure provides a method of controlling a bias of an inner MZM of a quadrature modulator fabricated in a semiconductor material, the method comprising: applying a push-pull dither signal to both arms of the inner MZM; and, tuning the bias of the inner MZM so as to minimize a signature of the push-pull dither signal in an output optical signal of the quadrature modulator.

With reference to FIG. 1, there is schematically illustrated an example quadrature modulator (QM) 10 in the form of a nested MZM. The QM 10 may also be referred to as the IQ modulator. The QM 10 may be conveniently embodied as a photonic integrated circuit (PIC) formed in a semiconductor material such as silicon (Si). In some embodiments the QM 10 may be embodied in a silicon photonics chip using a silicon-on-insulator (SOI) platform. Two waveguide arms 11, 12, which are connected optically in parallel between an input optical splitter 13 and an output optical combiner 43, form an outer Mach-Zehnder interferometer (MZI) 40. The output optical combiner 43 may be for example in the form of a 2×2 optical coupler and may have a main output port 45 and a tap output port 48. A monitoring photodetector (PD) 33 may be coupled to the tap output port 48 of the output optical coupler 43. Each waveguide arm 11, 12 of the outer MZI 40 includes an inner MZM 20. Each inner MZM 20 includes one or more signal electrodes 25, and is configured to modulate a fraction of input light 101 propagating through the respective waveguide arm 11, 12 responsive to an electrical data signal $V_Q(t)$ or $V_I(t)$. The electrical data signals $V_Q(t)$, $V_I(t)$ are provided to the signal electrodes 25 coupled to waveguide arms of the respective inner MZM 20. Modulated optical signals at the output of the inner MZMs 20 are conventionally referred to as the in-phase (I) optical signal and quadrature-phase (Q) optical signal; they are combined in the output combiner 43 in quadrature, i.e. with the 90° phase shift between them, to obtain modulated output light 103. In some embodiments of QM 10, inner monitoring PDs 31 may be coupled to output tap ports of the inner MZMs 20 to monitor their output power.

Bias tuners 27 may be coupled to one of the waveguide arms of each inner MZM 20 to tune bias setting of the inner MZMs 20. An outer bias tuner 47 may be provided in one of the waveguide arms 11, 12 of the outer MZI 40. Each bias tuner 27, 47 may be in the form of an electrically-controlled phase shifter that is configured to control an optical phase difference $\phi_I$, $\phi_Q$, or $\phi_{IQ}$ accrued between the waveguide arms of a respective inner MZM 20 or the outer MZI 40 by locally adjusting a refractive index of one of the waveguide arms. Conventionally only one arm of each of the two inner MZMs 20 is provided with a bias tuner, which is sufficient to control the output phase difference between optical signals in the two MZM arms, and thus to set the MZM bias to any desired set point. A bias control circuit 60 electrically coupled to the bias tuners 27, 47 may be provided to control the bias settings of the inner MZMs 20 and the outer MZI 40.

Figure 2A:
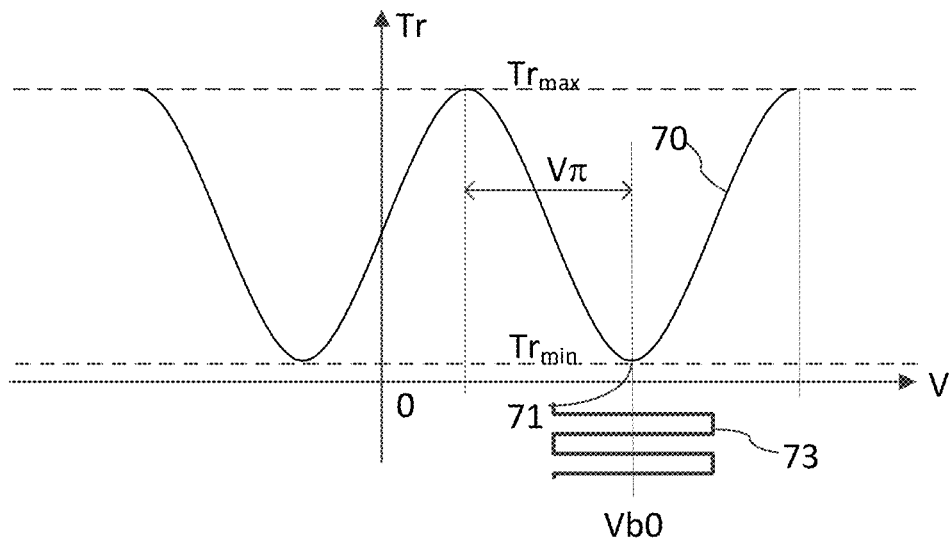
FIG. 2A is a graph schematically illustrating an MZM transmission function and the biasing of an inner MZM at a minimum-transmission point.

Principles of bias control of a waveguide MZM-based IQ modulator such as the QM 10 of FIG. 1 may be illustrated with reference to FIGS. 2A-3C and the QPSK modulation as an example. Referring first to FIG. 2A, it schematically illustrates an example transmission characteristic 70 of an MZM, such as either one of the inner MZMs 20. The transmission characteristic 70, which may be denoted T(V), defines the dependence of the MZM transmission coefficient upon a voltage V applied to the MZM, such as a bias voltage Vb or a signal voltage $V_I$ of $V_Q$. In FIG. 2A a linear dependence of an optical phase shift between the arms of the MZM on the applied voltage V is assumed by way of example. The transmission characteristic 30 oscillates between a maximum transmission $T_{max}$ and a minimum transmission $T_{min}$ as the voltage V increases. The ratio $T_{max}/T_{min}$ defines the extinction ratio (ER) of the MZM, which may be measured in decibels (dB). For an ideal MZM with loss-balanced arms, $T_{min}=0$, and the ER is infinite. However $T_{min}$ has a finite non-zero value if the two optical paths through the MZM are not perfectly balanced, for example the waveguide arms have different optical loss, resulting in a finite ER of the MZM. In the context of this specification, a minimum-transmission bias setting of an MZM corresponding to a minimum 71 in the transmission characteristic 70 of the MZM may be referred to as the null bias setting, or the null bias, regardless of $T_{min}$.

When the inner MZMs 20 are biased at their respective minimum transmission points 71, applying non-return-to-zero (NRZ) binary voltage waveforms $V_I(t)$ and $V_Q(t)$ that alternate between $+V_a$ and $-V_a$ to their respective signal electrodes 25 may produce two BPSK modulated optical signals at the MZM's outputs. FIG. 2A schematically illustrates such an NRZ signal 73 applied to an MZM biased at the minimum transmission point 71. A voltage amplitude $V_a$ of the NRZ signals may be equal to, or somewhat smaller than, the half-wave voltage $V\pi$ of the MZM in a representative embodiment. The half-wave voltage $V\pi$ may be defined as the signal voltage that causes the optical phase difference between the MZM arms to change by it radian. In the case of ideal inner MZMs 20 with loss-balanced arms, combining these two BPSK optical signals in quadrature, i.e. with a $\pi/2$ rad IQ phase shift IQ therebetween, produces QPSK-modulated light at the QM output.

In the example of QM 10 illustrated in FIG. 1, the IQ phase shift $\phi_{IQ}$ is controlled by a bias voltage $V_{IQ}$ applied to the bias tuner 47 of the outer MZI 40. The bias setting of the outer MZI 40 corresponding to the IQ phase shift $\phi_{IQ}=\pi/2+\pi \cdot n$, where n=0, 1, ..., may be referred to as the quadrature bias setting or the quadrature bias set point.

An ideal inner MZM 20 with infinite ER may be maintained at its minimum-transmission bias set point by applying a small bias dither signal to the MZM, and adjusting a DC bias voltage $V_{b0}$ to the corresponding bias tuner 27 so as to minimize a first harmonic of the bias dither signal in an output optical power of either the corresponding inner MZM 20, or the QM 10. In some embodiments, the second harmonic of the dither signal in the output optical power may be maximized to keep the MZM biased at its minimum transmission setting.

Figure 3A:
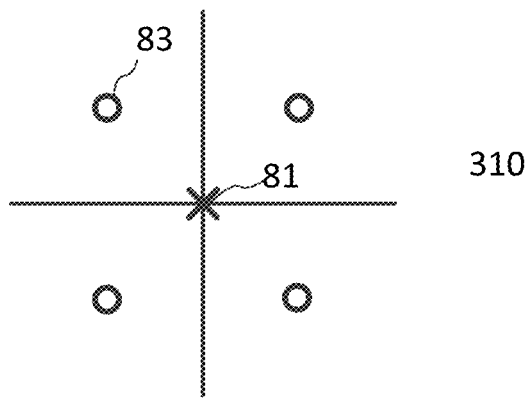
FIG. 3A is a graph illustrating an ideal QPSK constellation.
Figure 3B:
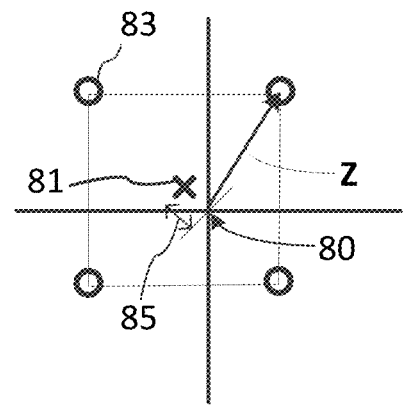
FIG. 3B is a graph illustrating a QPSK constellation with an IQ offset.

FIGS. 3A and 3B illustrate phasor diagrams of a QPSK signal that may be produced by the QM 10 as described above with ideal and non-ideal inner MZMs 20 which are null-biased. A phasor diagram represents locations of modulation symbols 83 of a QAM or QPSK signal in an (I, Q) plane. The plurality of all symbol locations in a phasor diagram may be referred to as a (signal) constellation.

FIG. 3A illustrates an ideal QPSK constellation that may result from combining in quadrature the outputs of two ideal identical MZMs biased at their minimum transmission points and modulated with NRZ signals of equal magnitude as described above. This ideal QPSK constellation is symmetrical with respect to a center zero-amplitude point 81. Similarly, a symmetrical QAM constellation may result when output optical signals of two ideal null-biased MZMs driven by multi-level PAM signals are combined in quadrature.

FIG. 3B illustrates a distorted QPSK constellation that may result from combining in quadrature output optical signals produced by two non-ideal MZMs with a finite ER that are biased at their respective minimum transmission points. In this case keeping each of the inner MZMs 20 at its null bias set point 71, and combining their outputs in quadrature, results in a non-zero offset 85 of a central point of the constellation from a zero-amplitude point 80. The offset 85, which may be referred to as the IQ offset 85, is a function of the ER in the inner MZMs 20 and the outer MZI 40. The presence of the IQ offset 85, which may reveal itself as a carrier pass-through in the output optical power of a QM, is a signal distortion that reduces the signal quality and may lead to an increased bit error rate (BER) at the receiver.

Figure 4:
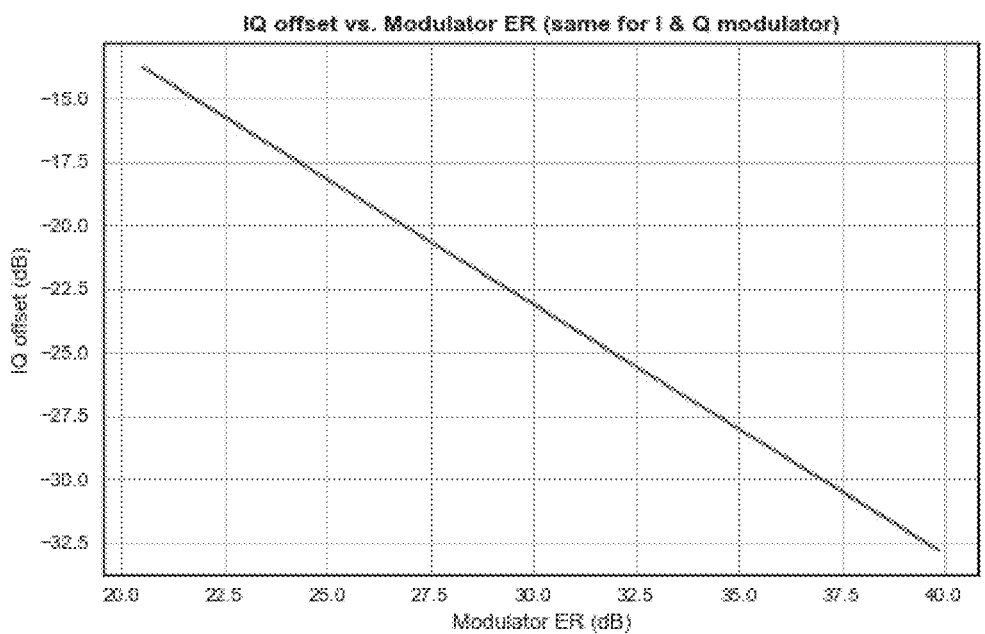
FIG. 4 is a graph illustrating the IQ offset of an embodiment of the IQ modulator of FIG. 1 having two inner MZMs of a same ER biased at the transmission minimum, in dependence on the ER of the inner MZMs.

FIG. 4 illustrates an example dependence of a normalized IQ offset of the IQ modulator 10 on the ER of the inner MZMs 20, which are assumed to be identical by way of example, and which are null-biased (i.e. biased at the minimum-transmission points of their transfer characteristics). Here, the IQ offset is defined in dB as $20 \cdot \log(z/\langle \mathbf{Z} \rangle)$, where "z" is the absolute value of the IQ offset 85 and "$\langle \mathbf{Z} \rangle$" is the RMS (random mean square) length of the symbol vectors "Z" in the phasor diagram, one of which indicated in FIG. 3B. A non-zero IQ offset 85 associated with a low ER may cause a significant penalty in an optical signal to noise ratio (OSNR) at the receiver. For example a receiver may be characterized by an OSNR value, termed ROSNR, which is required to keep the BER below a specified level. In some transmission systems a non-zero IQ offset as low as −25 dB may result in a significant ROSNR penalty. Therefore it may be desired that the IQ offset is kept below an acceptable level, for example at or below −30 dB, which may require inner MZMs 20 of the QM 10 to have a very high ER, for example about 37 dB or greater.

Figure 2B:
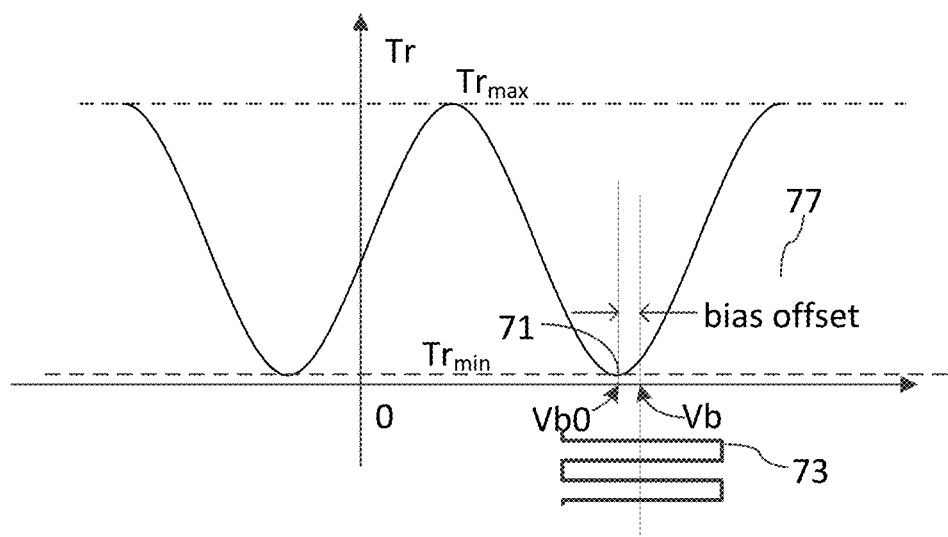
FIG. 2B is a graph schematically illustrating an MZM transmission function and the biasing of the MZM with an offset from the minimum-transmission point.

Referring to FIG. 2B, the ER-caused IQ offset 85 in the constellation diagram of an output signal of a QM may be reduced by biasing an inner MZM 20 with a small offset 77 from the minimum transmission point 71, which may be referred to as the bias offset 77. For an ideal inner MZM 20 with infinite ER, a bias offset 77 from the null bias setting 71 would cause a carrier pass-through in the output optical signal 103 of the QM 10. However for a non-ideal inner MZM 20 with a relatively low ER, an optimum value of the bias offset 77 may instead eliminate or reduce the ER-related carrier pass-through, and the IQ offset associated with it.

One convenient method to control all three bias settings of the QM 10, i.e. those of the two inner MZMs 20 and the outer MZI 40, may include i) applying a first bias dither signal $V_{d1}(f_1)$ at a first dither frequency $f_1$ to one of the two inner MZM 20 and a second bias dither signal $V_{d2}(f_2)$ at a second dither frequency $f_2$ to the other of the two inner MZM 20, ii) monitoring the strength of the two dither frequencies $f_1$, $f_2$ and their sum frequency $f_s=(f_1+f_2)$ in an averaged optical power at the output of QM 10, for example in the electrical PD signal from the monitoring PD 33, and iii) adjusting the DC bias settings of the bias tuners 27, 37 so as to minimize the two dither frequencies $f_1$, $f_2$ and their sum frequency $f_s=(f_1+f_2)$ in the electrical PD signal from the output monitoring PD 33. In some embodiments a difference frequency $f_d=|f_1-f_2|$ may be monitored and minimized in the electrical PD signal from the output monitoring PD 33 to arrive at the target bias setting. The dither frequencies $f_1$, $f_2$ are typically much smaller than the signal data rate of the modulator, and may be selected for example in the range of 1 to 10 kHz.

Figure 3C:
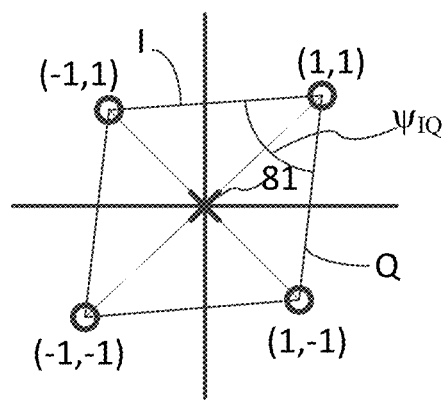
FIG. 3C is a graph illustrating a QPSK constellation with a quadrature distortion (an IQ phase offset)

Advantageously, adjusting the DC bias settings of the inner MZMs 20 so as to minimize the dither frequencies $f_1$, $f_2$ in the optical power at the output of QM 10 leads to the bias offsets 77 of the inner MZMs 20 that minimize the carrier pass-through in the output optical signal 103 of the QM 10, which corresponds to eliminating or at least reducing the IQ offset 85. However, we found that in a QM with a single-push bias control, such as QM 10 of FIG. 1, this type of bias control may simultaneously cause the appearance of a quadrature error in the output signal constellation, which is illustrated in FIG. 3C. The terms "single-push bias", "single-push bias dither", and their derivatives refer to a type of bias control when an MZM bias is adjusted or dithered by affecting only, or predominantly, one arm of an MZM or an MZI. Single-push bias and single-push bias dither is typically used for silicon-based or generally semiconductor-based integrated IQ modulators such as QM 10 illustrated in FIG. 1, in which linear electro-optic effect may be absent or too weak to adjust the optical phase as needed, and in particular when heater-based bias tuners are used to vary the refractive index in one of the MZM arms. In such embodiments, bias control methods that are based on minimizing the presence of a signature of an MZM bias dither in an output signal of the QM may result in a quadrature error in the output optical signal of the QM that correlates with the ER of the inner MZMs.

FIG. 3C schematically illustrates a QPSK constellation that may be obtained at the output of QM 10 using the bias control scheme described above, when the inner MZM dither frequencies $f_1$, $f_2$, and their sum frequency $f_s=(f_1+f_2)$ is minimized in an output optical signal of the IQ modulator. While reducing or eliminating the IQ offset in the output constellation, this bias control scheme with single-push bias tuners 27 simultaneously causes an angular distortion of the constellation. This angular distortion may be referred to as the quadrature error (QE) and may be denoted as $\delta\psi_{IQ}$. In an ideal QPSK constellation, the four QPSK symbols (1,1), (−1,1), (−1,−1) and (1,−1) form corners of a square in the (I,Q) plane, so that the angle $\psi_{IQ}$ between e.g. a vector connecting the (−1,1) and (1,1) symbol points in the QPSK constellation and a vector connecting e.g. the (1,−1) and (1,1) symbol points in the QPSK constellation is $\pi/2$ rad. The quadrature error $\delta\psi_{IQ}$ may be defined as a deviation of that angle from $\pi/2$, i.e. $\phi\psi_{IQ}=|\pi/2-\psi_{IQ}|$. In a QM with single-push bias control, the QE may be the greater, the lower is the ER of the inner MZMs. The QE may be reduced by a suitable choice of the waveguide arms of the inner MZMs 20 where the bias tuners 27 are located. Specifically, for inner MZMs 20 with given ER values, the aforedescribed bias control scheme may yield a relatively higher QE in embodiments with a "loss-symmetric" bias tuner placements compared to embodiments with a "loss-antisymmetric" bias tuner placement. Here the "loss-symmetric" tuner placement corresponds to placing the bias tuners 27 either both in higher-loss arms of the respective inner MZMs 20, or both in lower-loss arms of the respective inner MZMs 20. The loss-antisymmetric tuner placement corresponds to placing one bias tuner 27 in a higher-loss arm of one of the inner MZM 20, while placing the other bias tuner 27 in the lower-loss arm of the other inner MZM 20.

Figure 5:
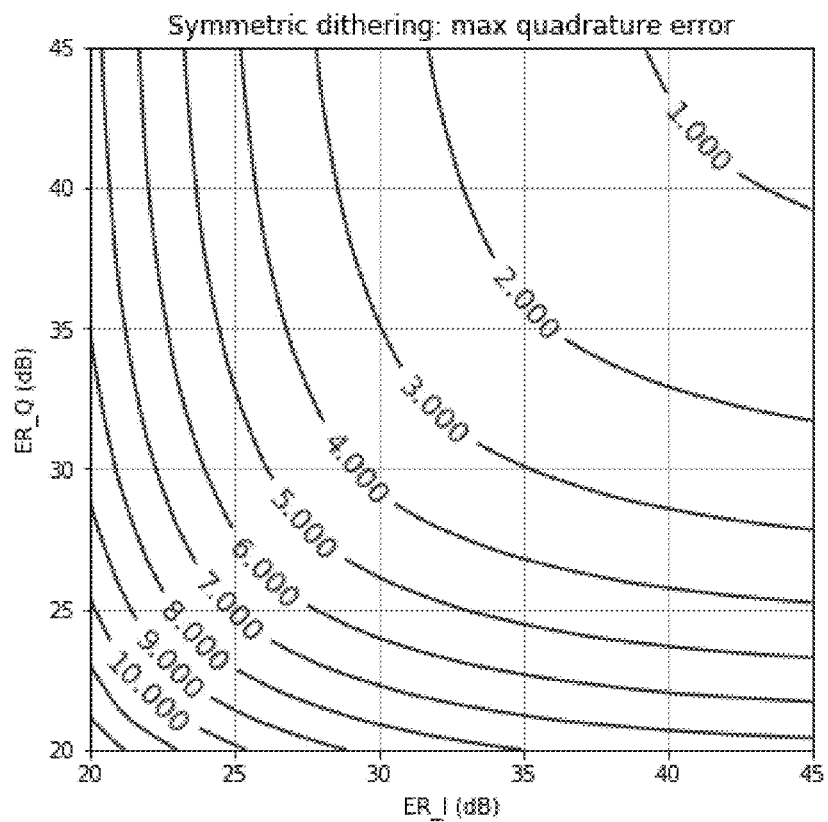
FIG. 5 is a graph illustrating the quadrature error at the output of an IQ optical modulator with offset-biased inner MZMs in dependence on the ERs of the I-MZM and the Q-MZM; each curve is labeled with a possible value of the quadrature error in degrees.

By way of example, FIG. 5 illustrates how the quadrature error (QE) $\delta\psi_{IQ}$ of a 16QAM-signal at the output of the QM 10 with single-push bias tuners 27 may depend on the ERs of the inner MZMs 20. The horizontal and vertical axes indicate the ER of the two inner MZMs, denoted as ER_I (dB) and ER_Q(dB). Each curve corresponds to a specific value of the QE $\delta\psi_{IQ}$ that may result in a loss-symmetric placement of the bias tuners, from 11 degrees down to 1 degree, with a 1 degree increment.

Although a receiver ROSNR may be less sensitive to the quadrature error (QE) than the IQ offset, low ER values of the inner MZMs may result in a quadrature error $\delta\psi_{IQ}$ that is sufficiently large to degrade a transmission link performance. By way of example, a measurable ROSNR penalty at the receiver may be caused by a QE in excess of about 5 degrees in the case of QPSK modulation, in excess of about 2 degrees in the case of a 16-QAM modulation, and in excess of about 1 degree for 64QAM modulation.

Typically, semiconductor-based integrated IQ modulators, such as the QM 10, use resistive heaters as bias tuners 27 and 47, and usually in only one of the arms of each inner MZM. The phase shift induced in a waveguide arm by such bias tuner is proportional to the amount of heat generated by the resistive heater, and is uni-directional as a function of bias voltage Vb applied thereto, i.e. it always changes in the same direction as the absolute value of the voltage applied across the resistive heater increases, regardless of the sign of the voltage across the resister heater. The bias control using such uni-directional single-push bias tuners is associated with a significant correlation between the ER of the inner MZMs and the QE at the output of the IQ modulator.

An aspect of the present disclosure relates to a discovery that both the IQ offset and the QE of an IQ modulator with finite ERs of the inner MZMs may be substantially reduced by using push-pull bias dither signals in a bias control scheme of the type described above with. The term "push-pull" refers to a type of bias control of an MZM, including the bias dither, when the two MZM arms are affected simultaneously but in the opposite directions. For example a push-pull dither signal applied to an MZM may change the refractive indices of the two MZM arms in the opposite direction, increasing the optical length of one of the MZM arms while simultaneously decreasing the optical length of the other, preferably by a same amount. In some embodiments, a push-pull dither signal applied to an MZM may be at any given moment increasing the refractive index in one of the MZM arms while simultaneously decreasing it in the other MZM arm at the same rate. By using a push-pull dithering scheme in the inner MZMs, the inter-dependence between the ER of the inners MZMs and the QE may be significantly reduced or eliminated.

Figure 6:
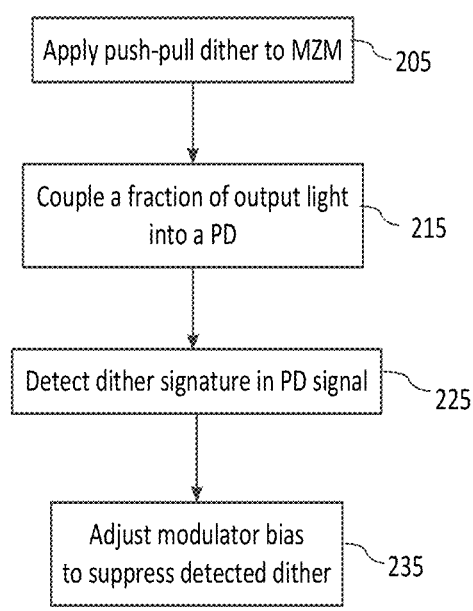
FIG. 6 is a flowchart of a method of bias control of an MZM using push-pull dither.

FIG. 6 generally illustrates method 200 of bias control of a semiconductor-based MZM according to an embodiment of the present disclosure. In some embodiments the MZM may be a part of an optical modulation circuit (OMC), such as a nested IQ modulator described above, which may be embodied as a PIC in a photonic chip. Each block of the flowchart represents a step, action, or operation that may be performed by the optical modulator or a bias control circuit thereof, and may be referred to herein as step. Method 200 may include step 205 in which a push-pull dither is applied to the MZM, step 215 in which a fraction of light at the output of the MZM or of the OMC is coupled into a monitoring photodetector (PD), step 225 in which a signature of the push-pull dither signal is detected in an electrical PD signal obtained from the monitoring PD to provide a dither feedback, and step 235 in which the MZM bias is adjusted in dependence on the dither feedback. In some embodiments step 205 may include applying an offset push-pull dither to the MZM, as described below. In some embodiments the method may include providing a bias tuner in each arm of the MZM. Applying a push-pull bias dither signal to an MZM may include simultaneously changing a refractive index in each waveguide arm of the MZM in opposite directions. In some embodiments the bias tuners may be in the form of resistive heaters, which in operation may continuously apply heat to each MZM arm. Detecting the signature of the push-pull dither signal in the PD signal may include detecting a first harmonic or a second harmonic of the push-pull dither signal.

Figure 7:
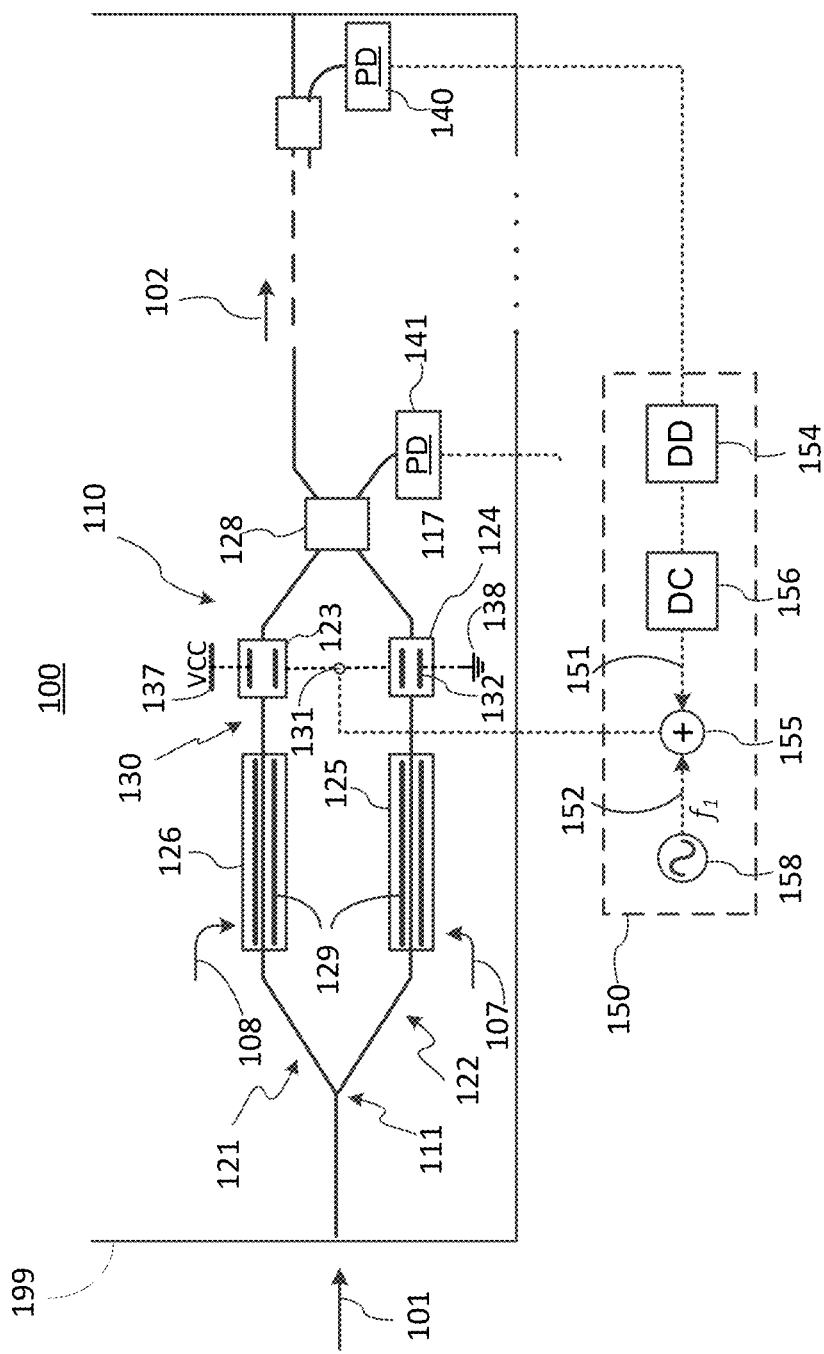
FIG. 7 is a schematic diagram of an optical modulator including an MZM with commonly connected bias tuners in two modulator arms for offset push-pull bias dithering.

FIG. 7 illustrates an optical modulator circuit (OMC) 100 that includes an MZM 110 and may be embodied as a PIC formed in a semiconductor material, for example as a photonic chip 199. In some embodiments the OMC 100 may be embodied in a silicon photonics chip using the silicon-on-insulator (SOI) platform. The MZM 110 includes a first waveguide arm 121 and a second waveguide arm 122, which are connected optically in parallel between an input splitter 111 and an output combiner 128. The waveguide arms 121, 122 of the MZM 110 may also be referred to as the MZM arms. The input splitter 111 is shown as a Y-junction waveguide but may also be embodied for example as an optical coupler, such as an evanescent optical coupler or a multi-mode interference (MMI) optical coupler. The output combiner 128 is shown as a 2×2 optical coupler, which may be for example an MMI coupler or an evanescent coupler. The output combiner 128 may also be embodied with a Y-junction waveguide, which may be followed optically by a coupler with a tap port. In some embodiments the OMC 100 may also include an output coupler 161 disposed optically downstream of the MZM 110 to receive at least a portion of output light 102 of the MZM 110.

One or more signal electrodes 129 are electrically coupled to the first and second waveguide arms 121, 122 for forming two modulation sections 125, 126 of the respective waveguide arms. In some embodiments the modulation sections 125, 126 may be implemented with p/n junctions electrically coupled to the one or more signal electrodes 129 to modulate the refractive index of the waveguide arms 121, 122 in response to one or more voltage signals 108, 107 applied to respective signal electrodes 129. In some embodiments one of the MZM arms 121, 122 may be absent of a modulation section. Although FIG. 7 shows four electrodes in the modulation sections 125, 126 of the MZM arms, in various embodiments the number of signal electrodes 129 may vary from one signal electrode disposed between the MZM arms or by one of the MZM arms, to four signal electrodes, two per waveguide arm. Having two signal electrodes per MZM arm may enable dual-differential modulation of the MZM. In some embodiments each MZM arm 121, 122 may be provided with a separate signal electrode and a ground electrode.

MZM 110 further includes two bias tuners 123, 124, one for each MZM arm. The first bias tuner 123 may be coupled to the first MZM arms 121, while the second bias tuner 124 may be coupled to the second MZM arm 122. The bias tuners 123, 124 are configured to adjust a bias setting of the MZM 110 by locally tuning a refraction index in the first and second waveguide arms 121, 122, respectively, in response to electrical bias signals applied to the bias tuners 123, 124. An electrical bias circuit 130, which is electrically coupled to the first and second bias tuners 123, 124, provides bias signals thereto. The bias circuit 130 may be configured to facilitate a push-pull dither of the MZM bias at a dither frequency $f_1$ in response to one or more bias dither signals. In some embodiments the bias circuit 130 may be at least partially implemented within the PIC with on-chip electrical connections. The strength of the dither frequency $f_1$ in an optical signal downstream of the MZM 110 may be monitored by a bias controller 150 using a monitoring photodetector (MPD), such as an MPD 141 that may be coupled to a tap port of the output combiner 128, or an MPD 142 disposed optically downstream from the MZM 110, for example at the output of the OMC 100. The dither frequency $f_1$ may also be referred to herein as the first dither frequency $f_1$.

The bias circuit 130 may be operatively coupled to the bias controller 150, which in some embodiments may include a dither detector (DD) 154, a dither signal source 158, and a DC bias source 156. The dither signal source 158 may be configured to generate a dither signal 152 at the dither frequency $f_1$, for example in the form of a single-frequency tone. The DC bias source 156 is configured to generate a DC bias signal 151 responsive to a feedback signal from the DD 154. The DC bias source 156 may be configured to adjust the DC bias signal 151 in dependence on a dither feedback signal from the DD 154, which may represent for example a strength of a signature of the dither signal 152 detected by the MPD 141 or 142. In the illustrated example, the DD 154 is coupled to the output MPD 142 and is configured to measure the strength of the first dither frequency $f_1$ in the PD signal from the MPD 142. The DC bias source 156 may then adjust the DC bias signal 151 it provides in dependence on a dither feedback signal from the DD 154.

The bias tuners 123, 124 may each be a voltage-controlled element, such as a resistive heater that is configured to provide local heat to a portion of the respective waveguide arm 121 or 122, thereby rising its temperature and locally changing the refractive index in the waveguide proportionally to a change in the waveguide temperature. The amount of heat generated by a resistive heater, and the resulting local change in the refractive index of the waveguide, depends on a voltage drop $Vb_i$ across the respective bias tuner, where i=1, 2. The voltage drop $Vb_1$ across the first bias tuner 123 may also be referred to as the first bias voltage. The voltage drop $Vb_2$ across the second bias tuner 123 may also be referred to as the second bias voltage. A push-pull bias dither of the MZM 110 may be effected by dithering the voltage drops $Vb_1$ and $Vb_2$ across the bias tuners 123, 124 in counter-phase, so that $Vb_1$ and $Vb_2$ change in opposite direction at any given moment when a dither signal is applied.

In some embodiments an on-chip portion of the bias circuit 130 includes a high voltage terminal 137, a low voltage terminal 138, a bias control terminal 131, and electrical pathways connecting them to the bias tuners 123, 124. In some embodiments the bias control terminal 131 may be disposed off-chip, for example on a carrier to which the photonic chip with the MZM 110 is mounted, such as a PCB. The bias circuit 130 may be configured so that the bias tuners 123, 124 are electrically connected in series between the high voltage terminal 137 and the low voltage terminal 138. In operation the low-voltage terminal 138 is kept at a constant "low" voltage, which may correspond to a ground potential and assigned a zero value. The high-voltage terminal 137 in operation provides a constant "high" voltage Vcc, which determines the total voltage drop across the two bias tuners 123, 124:

$$Vb_1 + Vb_2 = Vcc. \quad (1)$$

The voltage Vcc may be referred to as the rail voltage, and may be a power-supply voltage, |Vcc|>0. The proportion in which the rail voltage Vcc is distributed between the two bias tuners 123, 124, may be controlled by adjusting a voltage Vb at the bias control terminal 131 that connects electrically between the two bias tuners 123 and 124:

$$Vb_1 = Vcc - Vb, \quad Vb_2 = Vb. \quad (2)$$

Dithering the bias control voltage Vb at the bias control terminal 131 at the dither frequency $f_1$ will effect a push-pull bias dither of the MZM 110, with the refractive indices in the first and second waveguide arms 121, 122 varying in counter-phase at the dither frequency $f_1$ responsive to the bias dither signal.

In operation the voltage Vb at the bias control terminal 131 is set by the bias controller 150, which is electrically connected to the bias control terminal 131 of the MZM 110. The voltage Vb, which may be referred to as the bias control voltage, may include an AC dither component $V_d(t)$ which oscillates at the dither frequency $f_1$ in accordance with the dither signal 152, and a DC voltage component that may be set by the DC voltage source 156 of the bias controller 150 in accordance with the DC bias signal 151. In some embodiments the DC voltage component of the bias control voltage Vb may be composed of an offset voltage $V_0$ and a variable DC bias voltage $V_{DC}$:

$$V_b = V_0 + V_{DC} + V_d(t) \quad (3)$$

In some embodiment the offset voltage $V_0$ may be equal to half of the rail voltage Vcc, $V_0 = Vcc/2$, so that each of the bias tuners 124 and 123 receives the same DC voltage drop Vcc/2 in the absence of the DC bias voltage $V_{DC}$:

$$Vb_1 = V_0 - V_{DC} - Vd(t) \quad (5)$$

$$Vb_2 = V_0 + V_{DC} + Vd(t) \quad (6)$$

In some embodiments the voltage dither signal Vd(t) may be in the form of a sine or cosine waveform of a dither amplitude:

$$Vd(t) = a \cdot \sin(2\pi f_1 t) \quad (7)$$

where the dither amplitude a is sufficiently small, for example on the order of $0.1 \cdot V\pi$ or less. The dither frequency $f_1$ is generally much smaller than a signal date rate of the MZM 110. By way of example, dither frequency $f_1$ may be in the range of 1 to 10 kHz, or more broadly in the range from a few hundred hertz to a few megahertz.

The push-pull bias dither of the MZM 110 may thus be effected by applying a single dither signal Vd(t) to the bias control terminal 131 of the MZM 110, which is disposed electrically between the two bias tuners 123, 124 and commonly connected to them. The bias controller 150 may be configured to measure the strength of the first dither frequency $f_1$ in the PD current of the MPD 141 or MPD 142. Tuning the variable DC bias $V_{DC}$ so as to minimize the strength of the dither frequency $f_1$ at the output of MPD 141 will tend to keep the MZM 110 at its minimum transmission point. Tuning the variable DC bias $V_DC$ so as to minimize the strength of the dither frequency $f_1$ at the output of MPD 142 may bias the MZM 110 at an offset from the minimum transmission point if the optical output signal 102 of the MZM 110 is coherently mixed with another optical signal upstream of the MPD 142.

Figure 8:
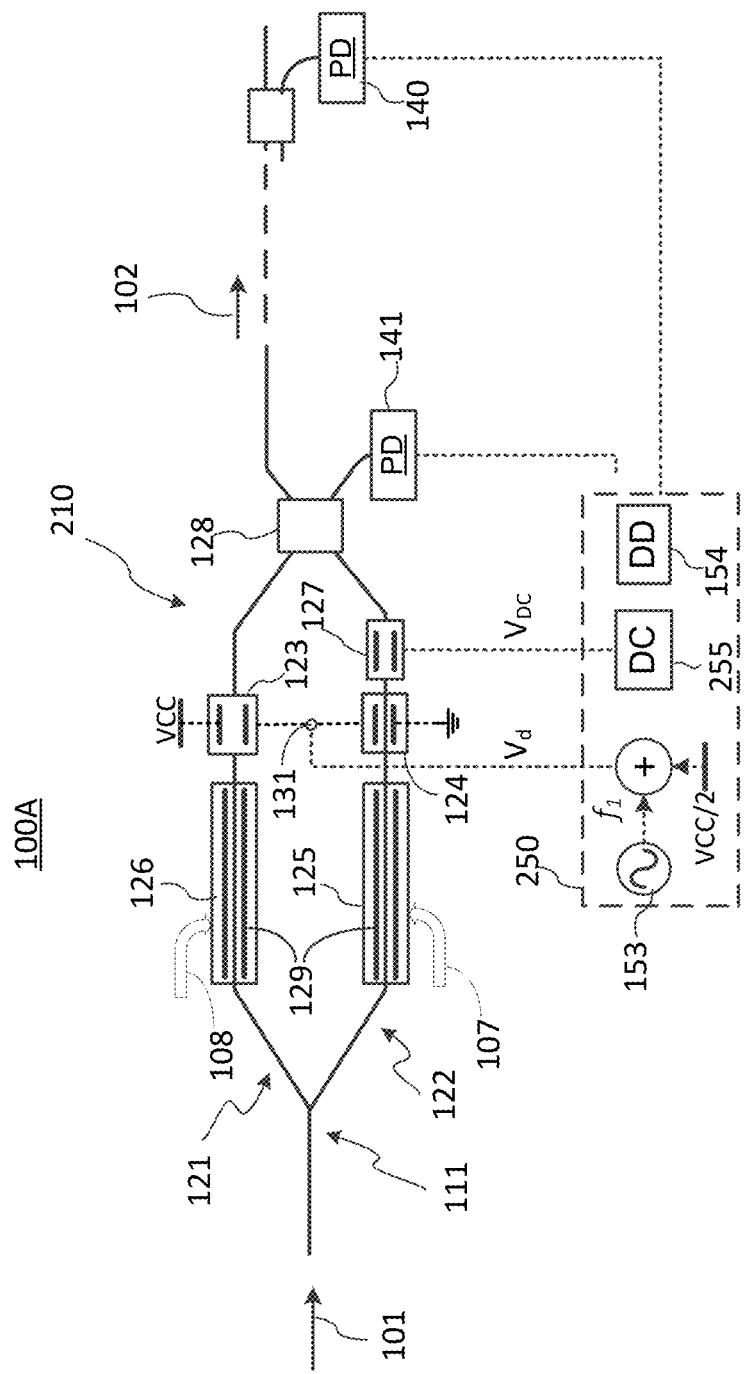
FIG. 8 is a schematic diagram of an optical modulator including an embodiment of the MZM of FIG. 7 with an additional bias tuner in one of its arms for DC biasing.

FIG. 8 illustrates a variation of the OMC 100, which may be generally referred to as the optical modulator 100A and in which MZM 110 is replaced with an MZM 210 having an additional bias tuner in one of the MZM arms. In FIG. 8, elements described above with reference to FIG. 7 are identified with same reference numerals and may not be described again. In the MZM 210, the variable DC bias voltage $V_DC$ may be provided to a third bias tuner 127, while the bias dither signal Vd(t) is provided to the common bias control terminal 131 of the first and second bias tuners 123, 124. The third bias tuner 127 may be disposed in one of the MZM arms 121 or 122 of the MZM 210. The first and second bias tuners 123, 124 may be connected in series as described above with reference to FIG. 7 to provide the push-pull dithering of the MZM bias when the voltage at the bias control terminal 131 is dithered. The bias dither signal $V_d(t)$ provided to the common bias control terminal 131 may be overlaid with a constant offset voltage $V_0$, which in some embodiments may be set to half of the rail voltage Vcc applied across the first and second bias tuners 123, 124.

Figure 9:
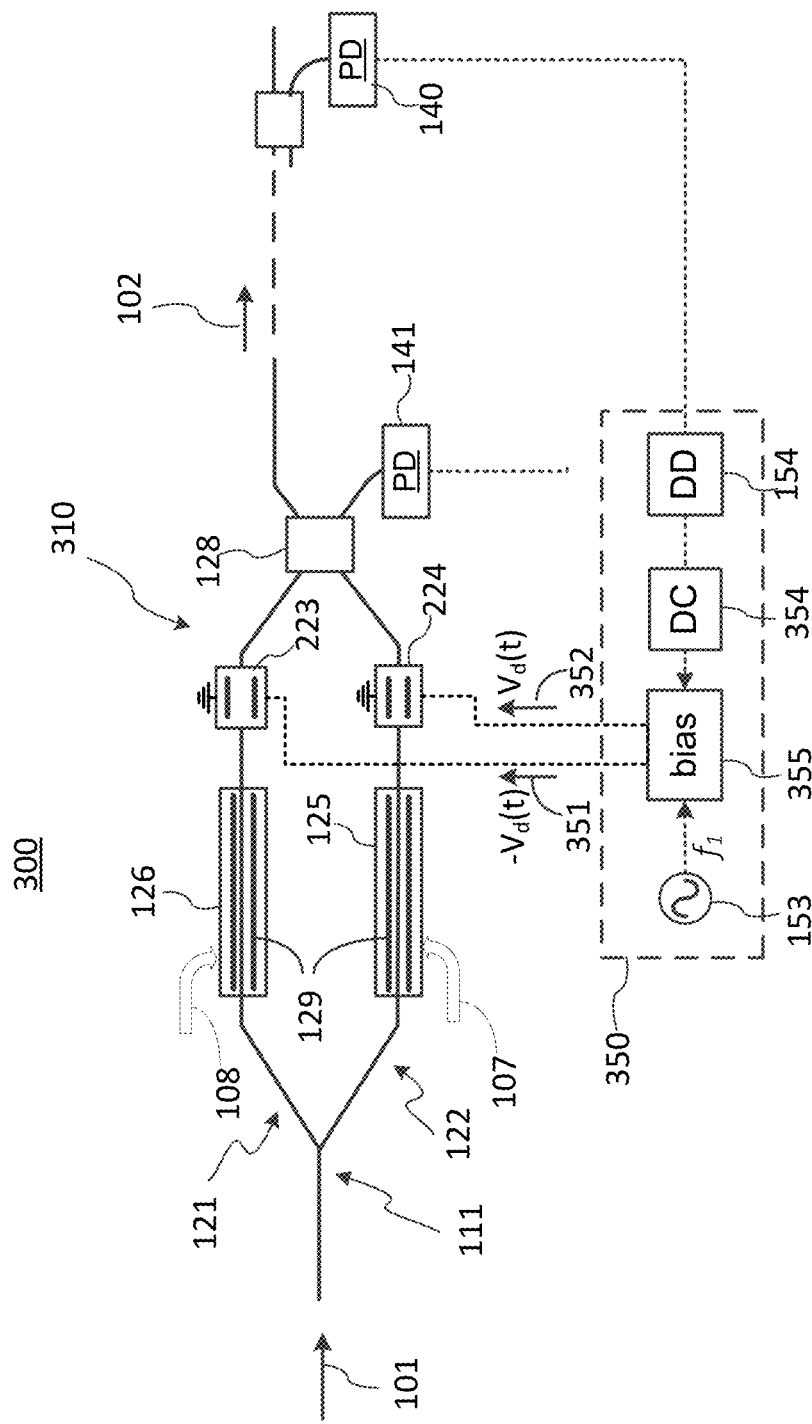
FIG. 9 is a schematic diagram of an optical modulator including an MZM with bias tuners in two modulator arms for push-pull bias dithering using two counter-phase dither signals.

FIG. 9 illustrates a variation of the optical modulator of FIG. 7, in which MZM 110 is replaced with an MZM 310 having bias tuners 223, 224 in the first and second waveguide arms 121, 122 thereof. The bias tuners 223, 224 of the MZM 310, which may be embodiments of the bias tuners 123, 124 of MZM 110, are controlled separately from a bias controller 350. The push-pull dithering of the MZM bias may be effected by the bias controller 350 providing two bias dither signals 351, 352, which oscillate in counter-phase at the dither frequency $f_1$, to the two bias tuners 223, 224. In some embodiments the bias controller 350 may be configured to provide to the first bias tuner 223 a first bias voltage $Vb_1$ that includes a first DC bias voltage $V_{DC1}$ and a first dither signal $V_{d1}(t)$, and to provide to the second bias tuner 224 a second bias voltage $Vb_2$ that includes a second DC bias voltage $V_{DC2}$ and a second dither signal $V_{d2}(t)=-c \cdot V_d(t)$, where c >0 is a calibration constant:

$$Vb_1 = V_{DC1} + V_{d1}(t) \qquad (8)$$

$$Vb_2 = V_{DC2} - c \cdot V_{d1}(t) \qquad (9)$$

where the scaling coefficient c may be set to 1 or determined at MZM calibration. The DC bias voltages $V_{DC1}$ and $V_{DC2}$ may be set by the DC bias source 354 responsive to a dither feedback signal from the DD 154. The bias voltages $Vb_1$ and $Vb_2$ and the counter-phase dither signals $V_{d1}(t)$, $V_{d2}(t)$ may be generated by a bias signal generator 355 in communication with the DC bias source 354 and the dither signal source 153. The counter-phase dither signals $V_{d1}(t)$, $V_{d2}(t)$ generated by the bias controller may be together referred to as the push-pull dither signal. In some embodiments the counter-phase dither signals $V_{d1}(t)$, $V_{d2}(t)$ may form single-ended components of a differential dither signal. In some embodiments the scaling coefficient c may be adjusted, for example in calibration, to account for differences in the efficiency of the first and second bias tuners 223, 224 and/or in the optical loss of the first and second waveguide arms.

Figure 10:
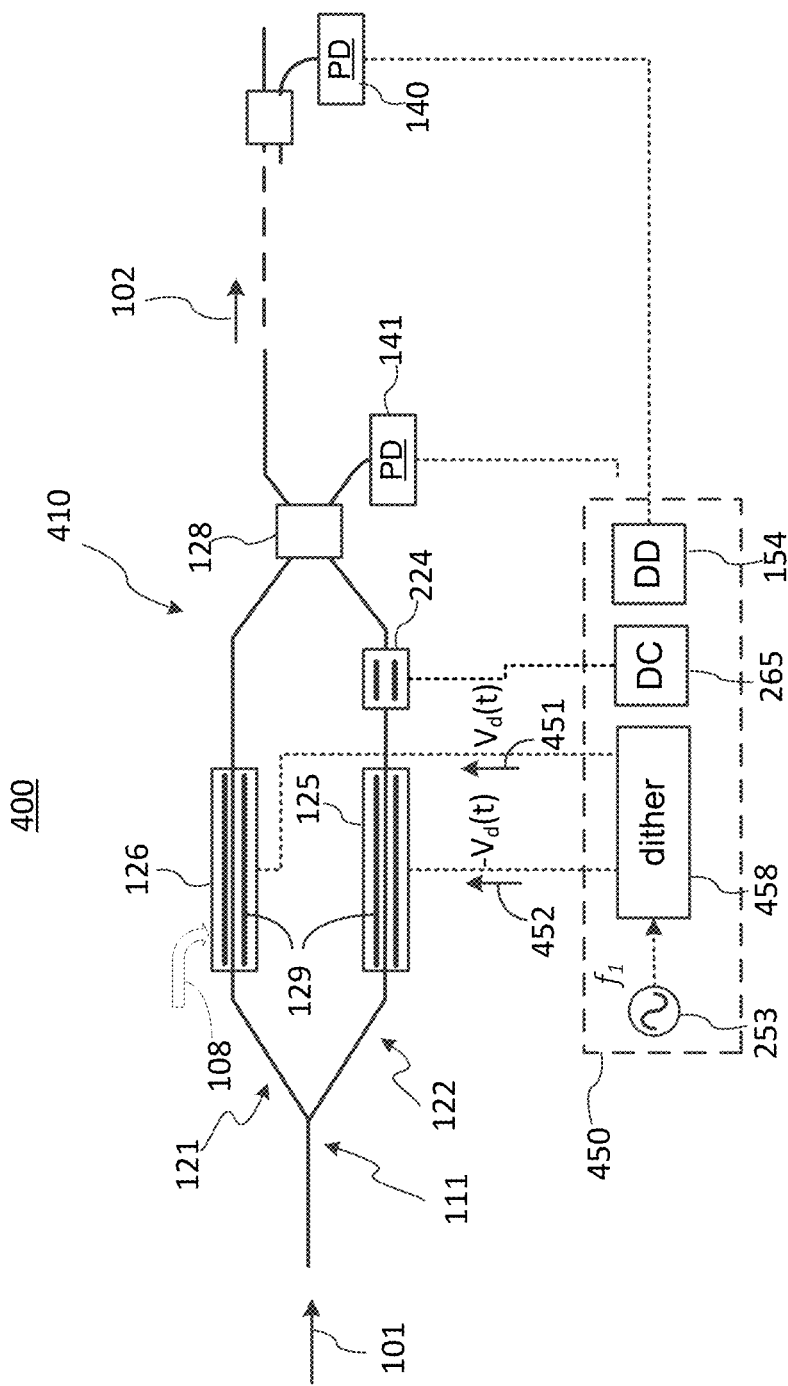
FIG. 10 is a schematic diagram of an optical modulator device including an MZM with push-pull bias dithering using signal electrodes.

Referring to FIG. 10, in some embodiments the control circuitry of an MZM may be configured to provide a push-pull bias dither signal or signals to the signal electrode or electrodes of the MZM. An MZM 410 shown in FIG. 10 may be an embodiment of MZM 110 described above. The modulation sections 125, 126 of the waveguide arms 121, 122 of the MZM 410, which may be comprised of p/n junctions, may be configured for push-pull modulation of the refractive index of the waveguide arms. Accordingly, they may also be used to effect a push-pull dithering of the MZM bias. In some embodiments the modulation sections 125, 126 may be driven in a push-pull manner by a high data rate modulation signal 108, and a lower-amplitude, low-frequency dither signal may be added to the high data rate modulation signal 108. In some embodiments one or more dither signals at the dither frequency $f_1$ may be applied directly to the one or more signal electrodes 129 of the MZM 410 to effect the push-pull dithering of the MZM bias. In the illustrated embodiment, a bias controller 450 includes a dither generating module 458 configured to provide counter-phase dither signals $V_d(t)$ 451 and $-V_d(t)$ 452 to the signal electrodes 129 coupled to different waveguide arms of the MZM. The counter-phase dither signals $V_d(t)$ 451 and $-V_d(t)$ 452 together may be referred to as the push-pull dither signal. In some embodiments the counter-phase dither signals $V_d(t)$ 451 and $-V_d(t)$ 452 may form single-ended components of a differential push-pull dither signal. The MZM 410 may further include one or more bias tuners in one or both waveguide arms, such as a bias tuner 224, for adjusting the DC bias of the MZM responsive to a DC bias signal from a DC bias source 265 in the bias controller 450.

Figure 11:
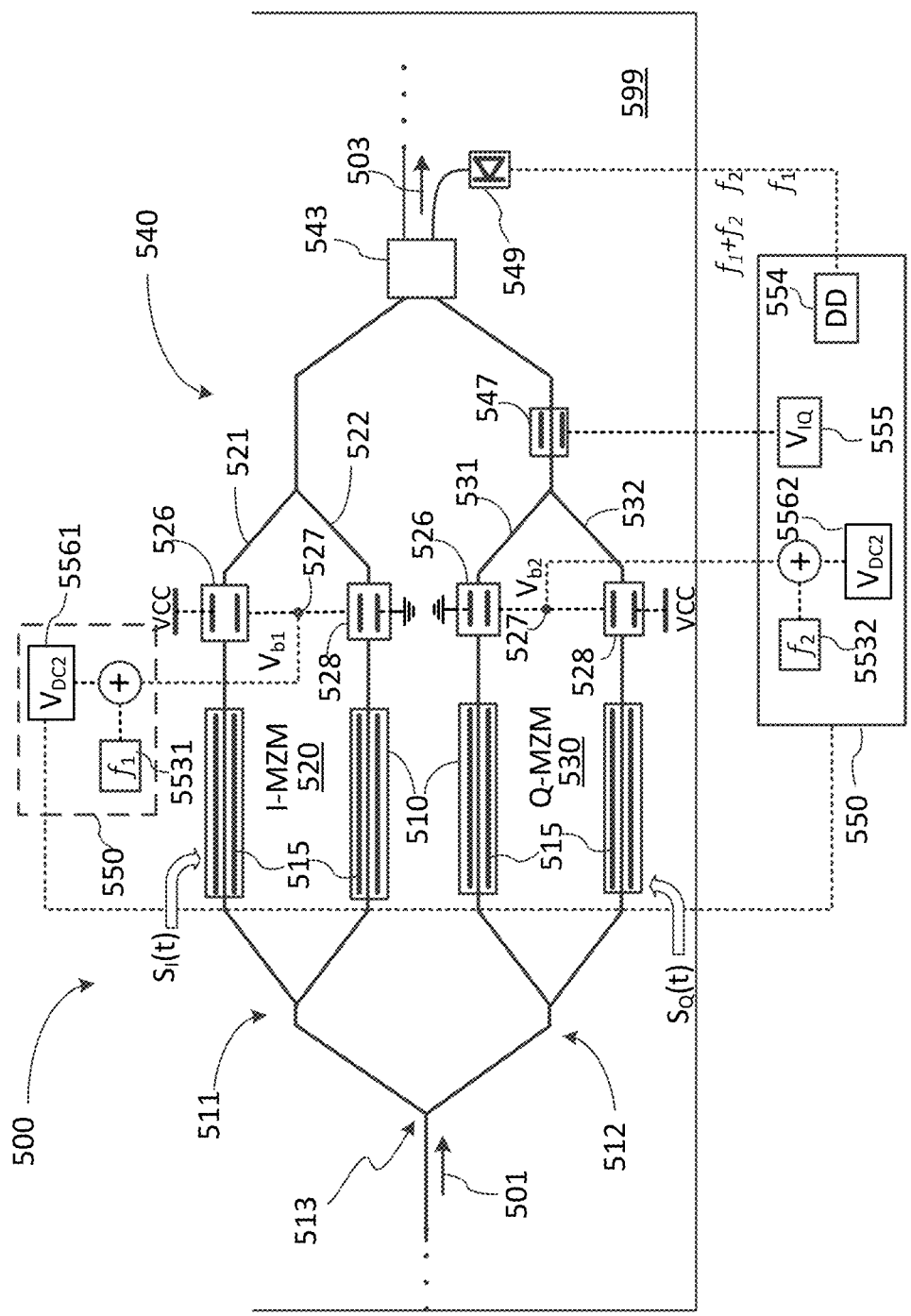
FIG. 11 is a schematic diagram of an optical modulator device including an IQ modulator with commonly connected bias tuners in the modulator arms of each inner MZM for offset push-pull bias dithering.

Referring now to FIG. 11, there is schematically illustrated an example QM 500 in which inner MZMs 520, 530 are configured for push-pull bias dithering. The QM 500, which may also be referred to as the IQ modulator, may be embodied as a PIC formed in a semiconductor material such as silicon (Si), and comprised in a photonic chip 599. The inner MZMs 520, 530 are connected optically in parallel between an input optical splitter 513 and an output optical combiner 543 with optical waveguides, so as to form an outer MZI 40. The inner MZMs 520, 530 may also be viewed as being disposed in waveguide arms 511, 512 of the outer MZI 540. The output optical combiner 543 may be for example in the form of a 2×2 optical coupler and may have a main output port and a tap output port. A monitoring photodetector (MPD) 549 may be coupled to the tap output port of the output optical coupler 543. In some embodiments of QM 500, inner monitoring PDs may be coupled to output tap ports of the inner MZMs 520, 530 to monitor their output power. In some embodiments, MPD 549 may be coupled to an optical tap downstream of the output optical combiner 543.

In the illustrated example the inner MZMs 520, 530 may each be an embodiment of MZM 110 described above with reference to FIG. 7, and may each include two bias tuners 526, 528 operatively coupled to different waveguide arms of the inner MZM. Each of the inner MZMs 520, 530 is also provided with one or more signal electrodes 515 configured to modulate light propagating through the MZM responsive to an electrical data signal provided to the signal electrode or electrodes.

In operation one of the two inner MZMs, for example MZM 520, may receive an I-channel electrical data signal $S_I(t)$ and output I-channel optical signal, while the other, for example MZM 530, may receive a Q-channel electrical data signal $S_Q(t)$ and output Q-channel optical signal. Accordingly MZM 520 may be referred to as "I-MZM", while MZM 530 may be referred to as "Q-MZM"; these designations are by way of example only and may be switched. The I-MZM 520 has two waveguide arms 521, 522, each of which including a modulation section 510 coupled to at least one signal electrode 515, and a first pair of bias tuners 526, 528 coupled to different waveguide arms of the I-MZM 520. Similarly, the Q-MZM 530 has two waveguide arms 531, 532, each of which including a modulation section 510 coupled to at least one signal electrode 515, and a second pair of bias tuners 526, 528 coupled to different waveguide arms of the Q-MZM.

The first pair of bias tuners 526, 528 in I-MZM 520 controls a relative optical phase $\phi_I=(\pi+\theta_1)$ between the MZM arms 521, 522, where $\theta_1$ is a phase offset from the null bias setting of the I-MZM, i.e. the point of a minimum MZM transmission. The second pair of bias tuners 526, 528 in Q-MZM 530 controls a relative optical phase $\phi_Q=(\pi+\theta_2)$ between the MZM arms 531, 532, where $\theta_2$ is a phase offset from the null bias setting of the Q-MZM, i.e. the point of its minimum transmission. It will be appreciated that $\phi_Q$ and $\phi_I$ are each defined modulus $2\pi$. The I-channel and Q-channel optical signals from the outputs of the inner MZMs 520, 530 are combined in the output combiner 543 to obtain output light 503. An IQ phase shift $\phi_{IQ}=(\pi/2+\theta_3)$ between the I-channel and Q-channel light in the output light 503 is controlled by an outer bias tuner 547 that may be coupled to one of the waveguide arms 511, 512 of the outer MZI 540 outsides of the respective inner MZM. In some embodiments each of the MZI arms 511, 512 may be provided with an outer bias tuner.

Each bias tuner 526, 528, 547 may be in the form of an electrically-controlled phase shifter that is configured to control an optical phase difference $\phi_I$, $\phi_Q$, or $\phi_{IQ}$ accrued between the waveguide arms of a respective inner MZM 520, 530 or the outer MZI 540 by locally adjusting a refractive index in one of the waveguide arms. In some embodiments each, or at least one, of the bias tuners 526, 528, 547 may be a voltage-controlled device such as a resistive heater, as described above with reference to FIG. 7. In some embodiments each, or at least one, of the bias tuners 526, 528, 547 may be in the form of a p/n junction. In the illustrated embodiment the two bias tuners 526, 528 of each inner MZM 520, 530 are electrically connected in series between two constant-voltage terminals, with a bias control terminal 527 electrically connected in-between the bias tuners 526, 528 to enable push-pull bias and push-pull bias dither of the respective inner MZM 520 and 530, as described above with reference to FIG. 7. In some embodiments the electrical connections between the two bias tuners 526, 528, and the bias control terminal 527 of each inner MZM may be integrated on-chip as a part of the PIC. In some embodiments these electrical connections and/or the bias control terminals 527 may be implemented in part off-chip, for example on a carrier to which the photonic chip 599 may be flip-chip bonded.

The bias setting of QM 500 may be controlled by an electrical bias circuit that includes a bias controller 550 and electrical conductors that connect the bias controller 550 to the bias control terminals 527 of the inner MZMs 520, 530 and to the outer bias tuner 547. The bias controller 550 is configured to generate bias voltages $V_{b1}$, $V_{b2}$, for controlling the pairs of bias tuners 526, 528 of the inner MZMs 520 and 530 respectively, and a bias voltage $V_{b3}$ for controlling the bias tuner 547 of the outer MZI 540.

In operation, when QM 500 receives input light 501, the bias controller 550 may provide a first dither signal $V_{d1}(t)$ at a first dither frequency $f_1$ to the bias control terminal 527 of the I-MZM 520, and to provide a second dither signal $V_{d2}(t)$ at a second dither frequency f to the bias control terminal 527 of the Q-MZM 530. The bias controller 550 may further be configured to measure the strength of the first dither frequency $f_1$, the second dither frequency $f_2$, and a combination dither frequency $f_3$ in the output signal of the MPD 549. The combination dither frequency $f_3$ may be one of the sum dither frequency $f_s=(f_1+f_2)$ or the difference dither frequency $f_d=|f_1-f_2|$. The bias controller 550 may further be configured to adjust the DC component $V_{DC3}$ of the IQ bias voltage $V_{b3}$ so as to minimize the measured strength of the combination dither frequency $f_3$, to adjust a DC component $V_{DC1}$ of the first bias voltage $V_{b1}$ applied to the I-MZM 520 so as to minimize the measured strength of the first dither frequency $f_1$, and to adjust a DC component $V_{DC2}$ of the second bias voltage $V_{b2}$ applied to the Q-MZM 530 so as to minimize the measured strength of the second dither frequency $f_2$.

An embodiment of the bias controller 550 illustrated in FIG. 11 includes a first dither source 5531 for generating a dither tone at the first dither frequency $f_1$, a second dither source 5532 for generating a dither tone at the second dither frequency $f_2$, and three DC bias sources 5561, 5562, and 555 for generating DC bias signals for the two inner MZMs 520, 530 and the outer MZI 540. The dither tone at the first dither frequency $f_1$ is combined with the DC bias control signal generated by the DC bias source 5561, and is provided to the bias control terminal 527 of the I-MZM 520 in the form of the first bias voltage $V_{b1}=V_{DC1}+V_{d1}(f_1)$. The dither tone at the second dither frequency $f_2$ is combined with the DC bias control signal generated by the DC bias source 5562, and is provided to the bias control terminal 527 of the Q-MZM 530 in the form of the second bias voltage $V_{b2}=V_{DC2}+V_{d2}(f_1)$. The DC bias control signal generated by the DC source 555 is provided to the IQ bias tuner 547 in the form of the third bias voltage $V_{b3}$. A dither detector (DD) 554 is configured to detect the strength of the two MZM bias dither frequencies $f_i$, i=1, 2, and their combination frequency $f_3$ in the electrical signal from the MPD 549, which is generally proportional to the optical power at the output of QM 500. The bias controller 550 may further include logic configured to adjust the DC bias signals from the DC sources 555, 5561, and 5562 so as to minimize the strength of each of the two MZM bias dither frequencies $f_i$, i=1, 2 and their combination frequency $f_3$ in the electrical signal from the MPD 549. The dither frequencies $f_1$ and $f_2$ are two different frequencies, and may be generally much lower than the signal data rate, and may be for example in a range from 1 kHz to 1 MHz, or more typically in the range of 1 kHz to 10 kHz. The dither frequencies $f_1$ and $f_2$ may be selected so that neither of them is a harmonic of the other.

In an ideal case when the inner MZMs 520, 530, and the outer MZI 540 are fully symmetric with respect to optical loss in their arms, minimizing the strength of each of the two dither frequencies $f_i$, i=1, 2 would drive each of the respective inner MZMs 520, 530 to their respective null bias points, $\theta_i=0$, i=1, 2, while minimizing the strength of the combination dither frequency $f_3$ would set the outer MZI 540 to a quadrature bias point, with $\theta_3=0$, resulting in an ideal QPSK or QAM constellation at the output of the QM as described above with reference to FIGS. 3A-3C.

For a QM with finite-ER inner MZMs, the strength of each of the two dither frequencies $f_1$, f and of their combination frequency $f_3$ in the optical power of the output light of the QM depends on all three phase offsets $\theta_i$, i=1, 2, 3. With a single-push bias dither, such as described above with reference to FIG. 1 and QM 10, minimizing the strength of each of the MZM dither frequencies $f_i$, i=1, 2 and of the combination dither frequency $f_3$ in the output optical power of the QM may result in a considerable quadrature distortion of the output signal constellation, as described above with reference to FIG. 3C and FIG. 5. By way of example, a QM with two inner MZMs having each an ER of 24 dB each, the quadrature error $\Delta\psi_{IQ}=|\psi_{IQ}-\pi/2|$ of an output QPSK signal may be as high as 8 degrees.

Advantageously, the use of a push-pull bias dither in the inner MZMs of a QM, such as that provided by the dual bias tuners 526, 528 in each inner MZM 520, 530 of QM 500, the bias control algorithm described above results in the bias settings of the inner MZMs and the outer MZI that virtually eliminates, or at least greatly reduces, both the IQ offset error and the quadrature error $\delta\psi_{IQ}$ caused by finite ERs of the inner MZMs 520, 530 and the arm loss asymmetry of the outer MZI 540. Analytical calculations and computer simulations show that an ideal control system implementing the bias control algorithm based on a push-pull bias dithering of inner MZMs that is fully symmetrical in its "pull" and "push" dither phases, and minimization of the two MZM dither frequencies $f_i$, i=1, 2 and the combination dither frequency $f_3$ in the output optical power of the QM, converges to an output signal in which the quadrature error (QE) is generally absent; a QE range of less than 0.01 degrees may be expected when accounting for typical limitations of real-life control systems, such as those related to a finite resolution of analog to digital converters and the finite size of a bias voltage adjustment step.

It will be appreciated from the description above with reference to FIGS. 8-10, the use of dual resistive heaters that are connected in series between a high-voltage and low-voltage terminals, with a variable-voltage terminal in the middle, is not the only way to provide push-pull bias dithering of inner MZMs of a QM of the type illustrated in FIG. 11. In some embodiments, the two bias tuners 526, 528 of each, or at least one of, the two inner MZMs 520 and 530 may not be electrically connected to each other on the chip; for example, the bias control terminal 527 may be disposed at a chip carrier, as described above with reference to FIG. 7. In some embodiments, the two bias tuners 526, 528 of each, or at least one of, the two inner MZMs 520 and 530 may be in the form of p/n junctions. In some embodiments, these two p/n junctions may be offset-biased in a depletion mode of operation. In some embodiments the push-pull dither signal provided to each bias tuner 526, 528 of at least one of the inner MZMs may be in the form of two counter-phase dither signals Vd(t) and −Vd(t), or Vd(t) and −cVd(t), as described above with reference to FIG. 9. In some embodiments a push-pull bias dither signal may be provided to the one or more signal electrodes of the inner MZMs. In some embodiments this push-pull bias dither signal may be provided to two or more signal electrodes of at least one of the inner MZMs in the form of a differential low-frequency dither signal composed of two counter-oscillating single-ended signals. In some embodiments a push-pull dither signal may be provided to the one or more signal electrodes independently on the data signal. In some embodiments a push-pull bias dither signal may be added to the data signal. In some embodiments a push-pull bias dither may be effected by applying a dither signal to a gain control circuit of a modulator driver that generates the $S_I(t)$ and $S_Q(t)$ modulation data signals provided to the signal electrodes of the I-MZM and Q-MZM.

The optical modulators described above may conveniently be embodied using optical waveguides formed in a layer of semiconductor material disposed upon a support substrate. For example, they may be embodied in a silicon layer of a SOI chip. The semiconductor material of the waveguides forming the MZM and MZI structures described above may have a substantially zero linear electro-optic coefficient, i.e. a linear electro-optic coefficient that is too small to provide suitably low $V\pi$ values, for example in the range below 10V. In such embodiments, using a resistive heater as an optical phase shifter to tune an MZM bias may be an attractive alternative. However resistive heaters are uni-directional phase shifters, which differentiates them from phase shifters based on the linear electro optic effect, and somewhat complicates their use for push-pull bias dithering; indeed, a resistive heater changes the refractive index of a material it heats in a same direction independently on the sign of the voltage applied, while the electro-optic phase shifters change the refractive index in opposite directions when the applied voltage changes its sign. However, operating two resistive heaters at a DC offset as described above enables their use for push-pull bias dithering of an MZM.

In some embodiments the MZM bias tuners may be implemented using linearized resistive heaters, i.e. resistive heaters that have an approximately linear dependence of the amount of heat they generate, and thus the local increase in the waveguide temperature, upon the applied bias voltage Vb. Generally the change in the refractive index of a waveguide arm of a semiconductor material such as silicon, and the optical phase shift $\Delta\phi$ associated with it, is a linear function of the temperature increase, which is a linear function of the amount of heat H generated by the heater. For an Ohmic resister heater which resistivity is independent on the applied voltage, the amount of heat is a square function of the applied voltage $V_b$, $H \sim V_b^2$, and therefore the optical phase shift $\Delta\phi$ provided by the bias tuner is a non-linear function of the applied voltage, $\Delta\phi \sim V_b^2$, as illustrated in FIG. 12A.

Figure 12A:
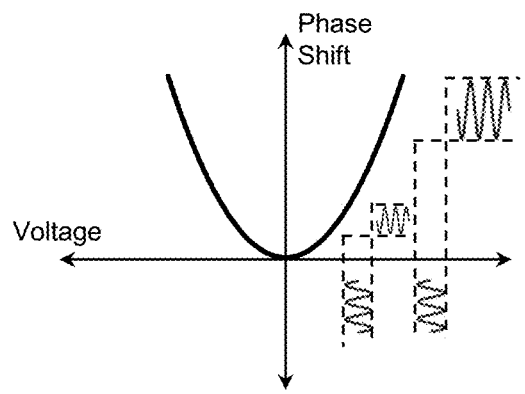
FIG. 12A is a graph schematically illustrating a quadratic phase shift response of a uni-directional bias turner based on an Ohmic resistive heater.
Figure 12B:
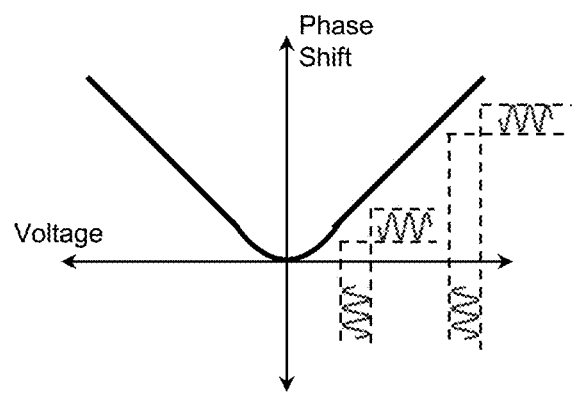
FIG. 12B is a graph schematically illustrating a linearized phase shift response of a uni-directional bias turner based on a non-Ohmic resistive heater with a sub-linear I-V characteristic.

FIG. 12A schematically illustrates the non-linear (quadratic) dependence of the optical phase shift $\Delta\phi$ induced by an Ohmic resistive heater upon the bias voltage Vb applied thereto. As a result of this non-linear, i.e. quadratic, dependence, the amplitude of the phase shift dither in a waveguide may depend on the DC bias voltage applied to the heater, as also illustrated in FIG. 12A. This effect may lead to an asymmetrical push-pull dither of an MZM when the DC bias voltages applied to the bias tuners in different MZM arms are different, which may lead to a non-optimal behavior of the bias control method described above. Contrary to that, a resistive heater with a linearized dependence of the amount of heat it dissipates on the applied voltage, as illustrated in FIG. 12B, provides a more symmetrical push-pull dither of an MZM bias wherein the amplitude of the phase shift dither is significantly less dependent on the DC bias voltage.

Figure 13B:
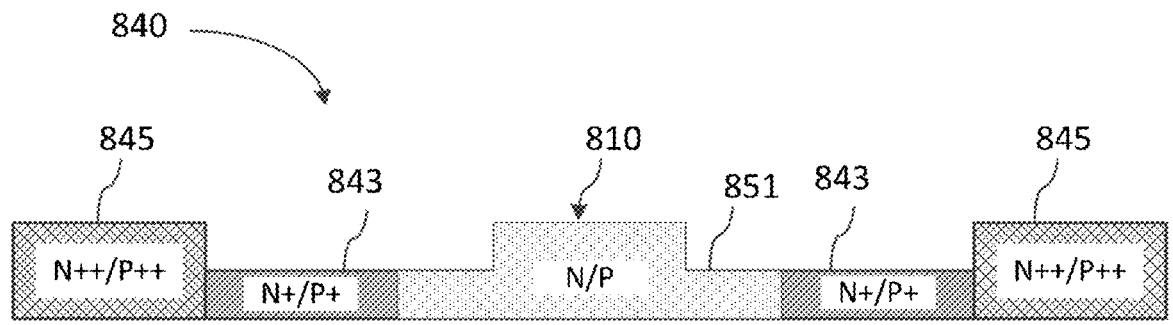
FIG. 13B is a side cross-sectional view of the linearized resistive heater of FIG. 10A.
Figure 13A:
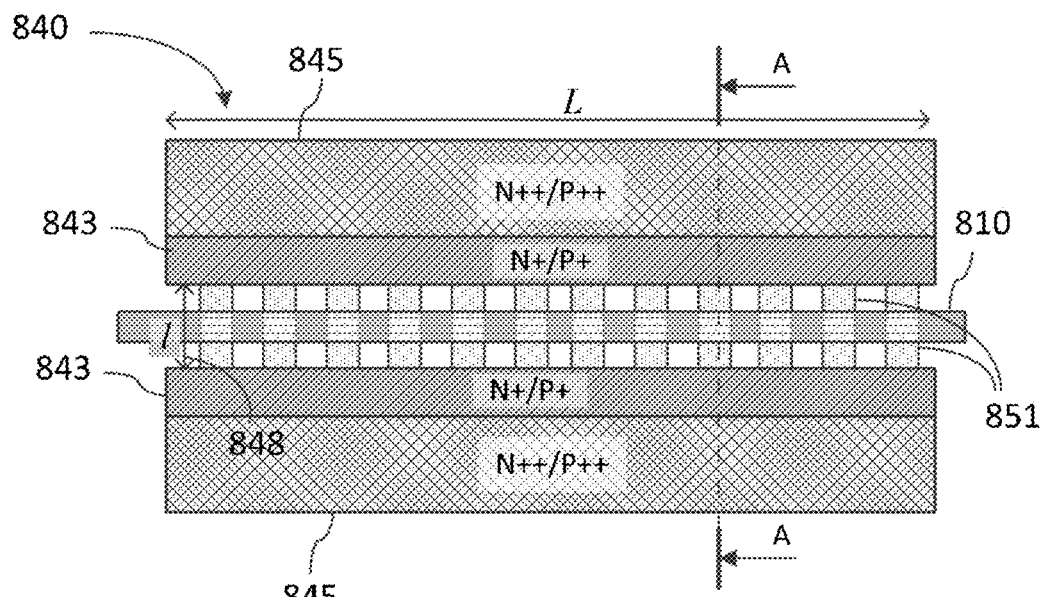
FIG. 13A is a schematic plan view of a linearized resistive heater formed by selective doping of a semiconductor waveguide.

Referring to FIGS. 13A and 13B, there is illustrated an embodiment of a linearized, non-Ohmic resistive heater 840 that may be used in pairs to provide push-pull bias dithering of an MZM as described above. The linearized, non-Ohmic resistive heater 840, which may be referred to below simply as heater 840, is configured to operate in a current saturation regime, where the electrical current J through the heater is a sub-linear function of an applied voltage $V_b$ in a target voltage range of the heater operation. Heater 840 may be formed in a layer of semiconductor material in which an optical waveguide 810 is defined, for example as a ridge. Heater 800 includes two heavily-doped contact regions 845 extending along a length L of the waveguide 810 on opposite sides thereof, and a plurality of resistive bridge regions 851 electrically connecting the contact regions 845. The resistive bridge regions 851, termed resistive bridges 851, may be spread along the length L of the waveguide 810, each crossing the waveguide 810 at a somewhat different location along its length. The use of the spaced apart resistive bridges 851 rather than a continuous resistive region extending along the length L of the heater reduces optical loss in the waveguide 810, but is generally not necessary for the operation of heater 840. In some embodiments two conducting regions 843 of intermediate but still high conductivity may be provided on one or both sides of the waveguide 810 to electrically connect the contact regions 845 to the resistive bridges 851. FIG. 13A illustrates the resistive heater 840 in the plane of a photonic chip where the heater is implemented, while FIG. 13B illustrates a cross-section of the semiconductor layer of the photonic chip across the resistive heater 840, along a line "A-A" through one of the resistive bridges 851 as indicated in FIG. 13A. By way of example, the heater 840 may include 20 to 50 resistive bridges formed in a silicon layer of thickness d=220 nm in the ridge waveguide 810 and 90 nm in the conducting regions 843, each bridge having a width w of 1 to 5 μm.

The contact regions 845, conducting regions 843, and resistive bridges 851 may be all N-doped or all P-doped. The doping level of the contact regions 845, indicated as one of "N++" or "P++" in the figure, and the conducting regions, indicated as one of "N+" or "P+" in the figure, may be much higher than the doping level of the resistive bridges 851, indicated as one of "N" or "P" in the figure, so as to ensure that most of the bias voltage Vb applied to the contact regions 845 drops across the resistive bridges 851. The electrical field E in the resistive bridges 851 can then be estimated as $$E \cong V/l, \quad (10)$$

where $V \cong V_b$, and l is the length of each resistive bridge 851, i.e. the width of the resistive gap 848 between the conducting regions 843 of the heater. The resistance R of a resistive bridge 851 is inversely proportional to the mobility μ of charge carriers therein. The mobility of electrons and holes in a semiconductor material starts to decrease when the applied electrical field E increases above a saturation field value $E_s$. In some approximation, the resistance R of a resistive bridge 851 may be described as $$R = R_0 \cdot \left[1 + \left(\frac{E}{E_s}\right)^\beta\right]^{1/\beta} = R_0 \cdot \left[1 + \left(\frac{V}{V_s}\right)^\beta\right]^{1/\beta} \quad (11)$$

where $R_0$ is a low-field resistance that depends on the material, doping, temperature, and cross-sectional area of the resistive bridge, β is a parameter that may depend on the material, and $V_s$ is a saturation voltage that is proportional to the length l of the resistive bridges 851:

$$V_s = E_s \cdot l, \quad (12)$$

The electrical current J flowing through a bridge 851 may be estimated as $$J = \frac{V}{R} = \frac{V_s}{R_0 \cdot \left[1 + \left(\frac{V_s}{V}\right)^\beta\right]^{1/\beta}} \quad (13)$$

and approaches a saturation current $J_s \sim V_s/R_0$ when $V \gg V_s$. The power H dissipated as heat by a resistive bridge 851 may then be estimated as $$H = J \cdot V = \frac{V_s V}{R_0 \cdot \left[1 + \left(\frac{V_s}{V}\right)^\beta\right]^{1/\beta}}. \quad (14)$$

Thus, the amount of heat H dissipated by a resistive bridge 851 tends to vary linearly with the applied voltage V at operating voltages greater than the saturation voltage Vs, i.e. when $V \gg V_s = E_s \cdot l$.

Generally the target voltage range of operation of a resistive heater 840 in an MZM may be from 0V to the rail voltage Vcc. When two resistive heaters 840 are electrically connected as described above with reference to FIGS. 7, 8, and 11 for the offset push-pull operation, each of the two resistive heaters of the MZM may operate in some voltage range about 0.5 Vcc, for example in a range of about 0.3 Vcc to about 0.7 Vcc; this range may be made wider or narrower, for example, by varying the length L of the resistive heater along the waveguide, i.e. the length of a portion of the waveguide that is being heated. By way of example, for an MZM implemented in a silicon photonics chip, Vcc may be 3.3V, and the target voltage range of the heater operation may be from about 0.9 V to about 2.4. V, but could be a broader range in some embodiments.

To operate in the saturation regime with a linearized thermally-induced phase shift in the waveguide as a function of the applied voltage, in some embodiments the length l of the resistive bridges 851 (i.e. the width of the resistive portion 848 of the heater) may be selected to satisfy the condition 0.3 Vcc>$V_s$, or $$l < \frac{0.3 \cdot Vcc}{E_s} \quad (15)$$

By way of example, for an MZM implemented in a silicon photonics chip, the saturation field $E_s$ for electrons may be about $7 \cdot 10^3$ V/cm and for holes about $1.45 \cdot 10^4$ V/cm. For Vcc=3.3V this corresponds to l less than about 1.4 μm for N-doped silicon material of the resistive heater, and less than about 0.7 μm for P-doped silicon material of the resistive heater.

Thus in some embodiments the length l of the resistive bridges 851, or equivalently the width of the resistive region or gap 848 between the conducting regions 843 of the heater, may be selected so as to operate in a saturation regime in the target voltage range, where the electrical current J flowing through a resistive bridge 851 depends sublinearly on the applied voltage V across the bridge approaching a saturation current. Here, the target voltage range is the range in which the bias voltage Vb applied across the resistive heater of a bias tuner is expected to vary during normal operation of the optical modulator. In some embodiments the heater 840 may be configured so that the bridge length (resistive gap width) l satisfies equation (15). In some embodiments, for example where the heater 840 is embodied in an N-doped silicon layer, it may be configured so that the length l is about or less than 1.4 μm, or about or less than 1 μm, with a lower bound that may be limited by a width of the waveguide arm being heated.

Figure 14A:
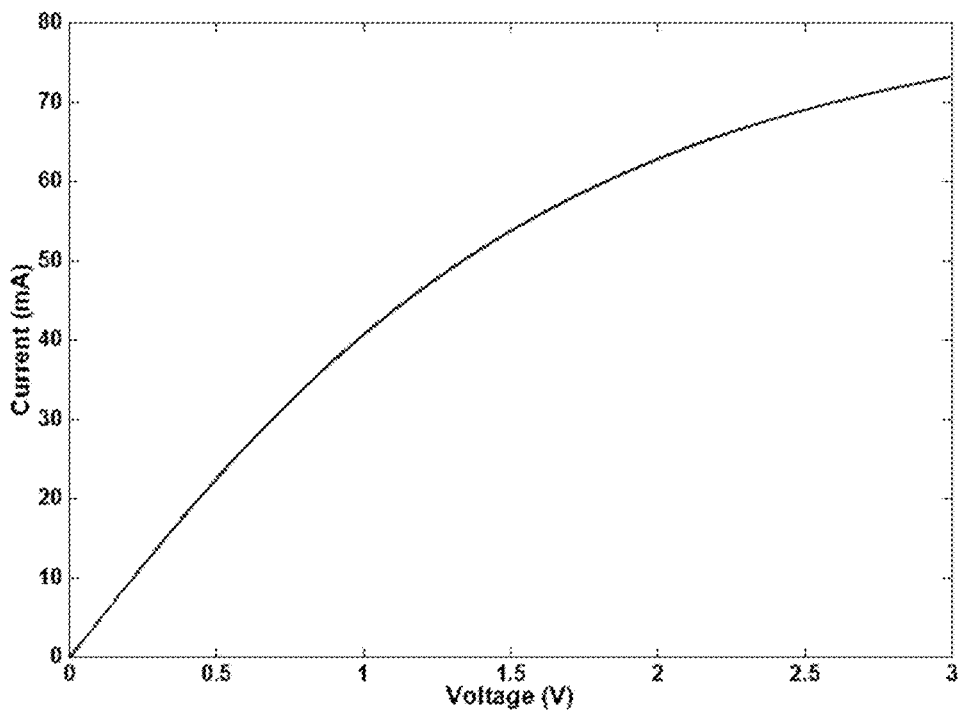
FIG. 14A is a plot showing measured I-V characteristic of an example linearized resistive heater as illustrated in FIGS. 13A and 13B.
Figure 14B:
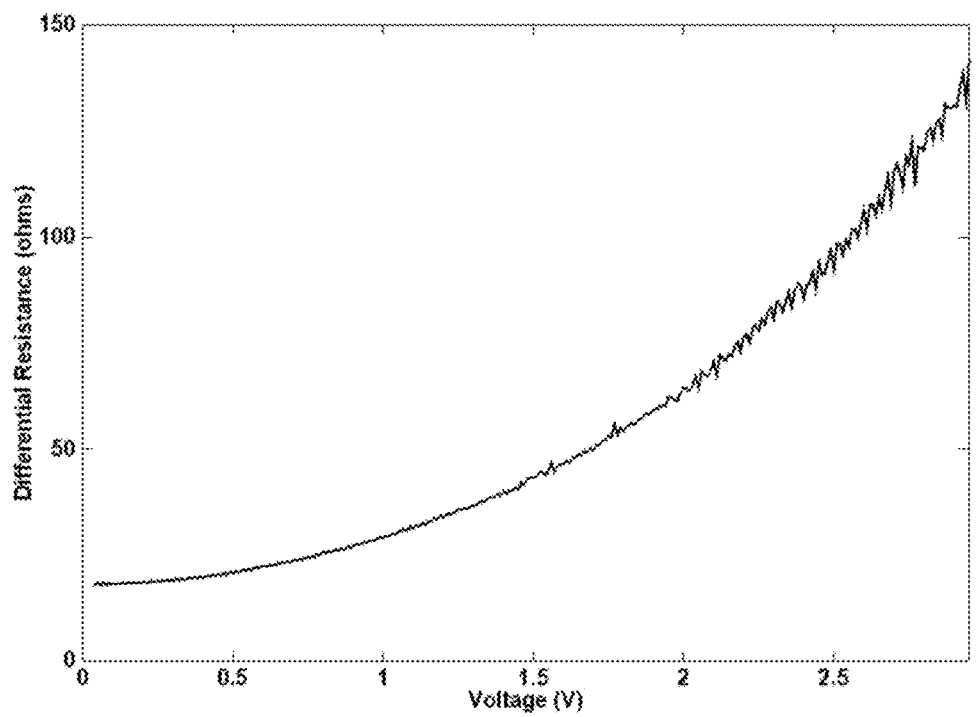
FIG. 14B is a plot showing the differential resistance dV/dI characteristic of the example linearized resistive heater with the I-V characteristic of FIG. 14A.

FIG. 14A illustrates the sub-linear I-V characteristic of an example embodiment of the heater 840 with 40 N-doped resistive bridges of length l=1 μm and width 2 μm each, formed in a 220 nm layer of silicon. The I-V characteristic becomes noticeably sublinear at voltages above about 1V, and starts to saturate at voltages above about 1.5-2V. FIG. 14B illustrates the corresponding rise of the differential resistance $r_d$=dV/dI of the example heater, which rises by a factor of about 4 across the operating range of the heater, which in this example may be from about 1V to 3V. Generally having the differential resistance of a resistive heater rising with the applied voltage across an operating voltage range of the heater by a factor of 3 or more, or preferably be a factor of 5 or more, may provide advantages for push-pull dithering of a modulator bias associated with the I_V linearization. The operating voltage range of the bias tuner may be for example from about 0.3 Vcc to Vcc.

Figure 15:
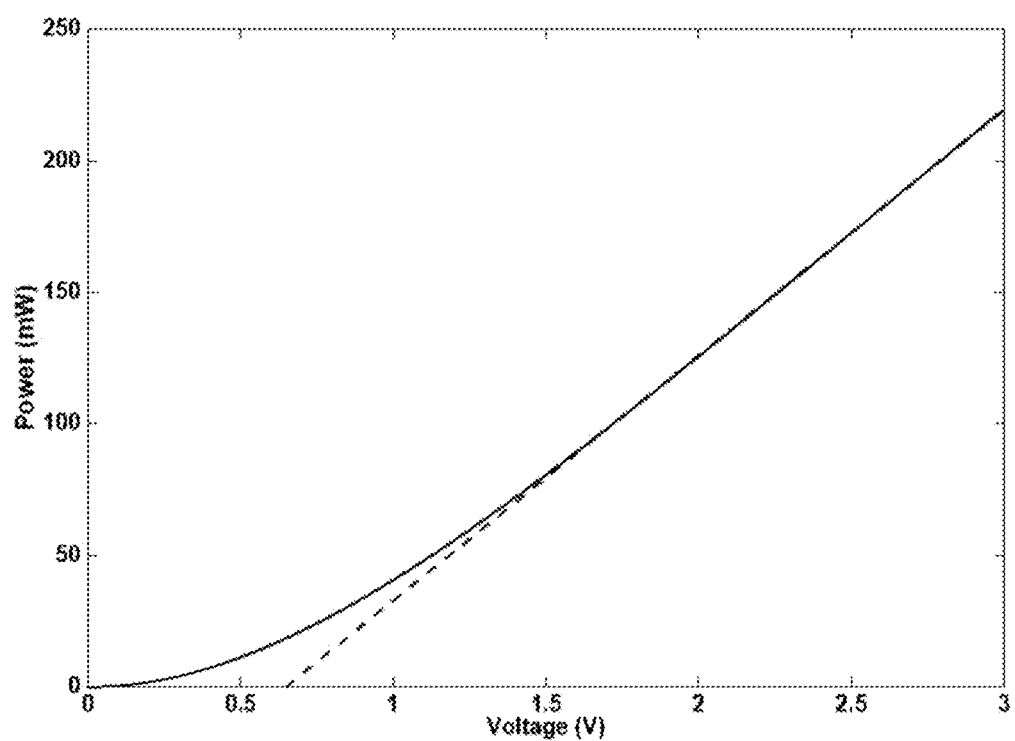
FIG. 15 is a plot showing the heating power of the example linearized resistive heater according to FIGS. 14A and 14B in dependence on the bias voltage applied thereto.

FIG. 15 illustrates the corresponding dependence of the power that the heater with the I-V characteristic of FIG. 14A dissipates as heat in dependence on the applied voltage, which approaches linear at voltages above about 1.3-1.5V. Two resistive tuners of this type may be used as the dual bias tuners of an MZM to provide push-pull bias dithering that is substantially independent on the DC component of the bias voltage above about 1.3V-1.5V.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that semiconductor materials other than silicon, including but not limited to compound semiconductor materials of groups commonly referred to as A3B5 and A2B4, such as GaAs, InP, and their alloys and compounds, may be used to fabricate a PIC modulator device example embodiments of which are described hereinabove. Furthermore, PIC modulator devices example embodiments of which have been described hereinabove may include other optical devices, such as for example, but not exclusively, optical couplers, optical taps, polarization controllers, polarization beam splitters, polarization beam combiners, polarization rotators. Furthermore, the bias control schemes of optical modulators constructed in accordance with principles described above may detect the strength of the second harmonic of the dither signal as the dither signature, and adjust the DC bias setting so as to maximize it, instead of minimizing the strength of the first harmonic. Suitably biased p/n junctions, for example to operate in the depletion mode, may be used in place of the resistive heaters to implement push-pull bias dither in some embodiments.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical modulator comprising:
 a first Mach-Zehnder modulator (MZM) formed in a photonic chip comprising a semiconductor material, the first MZM comprising:
  a first waveguide arm formed at least in part in the semiconductor material;
  a second waveguide arm at least in part in the semiconductor material;
  one or more signal electrodes electrically coupled to the first and second waveguide arms;
  a first bias tuner coupled to the first waveguide arm;
  a second bias tuner coupled to the second waveguide arm; and,
 an electrical circuit operatively coupled to the first and second bias tuners and configured to facilitate a push-pull dither of a bias setting of the first MZM in response to one or more bias dither signals;
 wherein the electrical circuit comprises a high-voltage terminal, a low voltage terminal, and a bias control terminal, wherein the first bias tuner is electrically connected between the high-voltage terminal and the bias control terminal, and the second bias tuner is electrically connected between the bias control terminal and the low-voltage terminal, so as to effect the push-pull dither of the bias setting of the first MZM with a common bias dither signal applied to the bias control terminal.

2. The optical modulator of claim 1 wherein each of the first and second bias tuners comprises a phase shifter configured to operate at a voltage offset.

3. The optical modulator of claim 1 wherein at least one of the first and second bias tuners comprises a resistive heater.

4. The optical modulator of claim 3 wherein the resistive heater comprises a sequence of doped resistive regions spread along a length of a corresponding waveguide arm and separated by undoped or less-doped regions.

5. The optical modulator of claim 3 wherein the resistive heater is configured to have a sub-linear current-voltage (I-V) characteristic in an operating voltage range of the at least one of the first and second bias tuners.

6. The optical modulator of claim 1 wherein at least one of the first and second bias tuners comprises a p/n junction.

7. The optical modulator of claim 1 further comprising a second MZM connected optically in parallel with the first MZM to form an optical IQ modulator, wherein the second MZM comprises two waveguide arms operatively coupled to two bias tuners configured for push-pull bias dither of a bias setting of the second MZM.

8. An optical modulator comprising:
 a first Mach-Zehnder modulator (MZM) formed in a photonic chip comprising a semiconductor material, the first MZM comprising:
  a first waveguide arm formed at least in part in the semiconductor material;
  a second waveguide arm at least in part in the semiconductor material;

one or more signal electrodes electrically coupled to the first and second waveguide arms;
a first bias tuner coupled to the first waveguide arm;
a second bias tuner coupled to the second waveguide arm; and
an electrical circuit operatively coupled to the first and second bias tuners and configured to facilitate a push-pull dither of a bias setting of the first MZM in response to one or more bias dither signals;
wherein at least one of the first and second bias tuners comprises a resistive heater;
wherein the resistive heater is configured to have a sub-linear current-voltage (I-V) characteristic in an operating voltage range of the at least one of the first and second bias tuners;
wherein the resistive heater comprises two conducting regions spaced by a resistive gap of width l that satisfies equation $$l < \frac{0.3 \cdot VCC}{E_s},$$

where VCC is a rail voltage of the photonic chip, and $E_s$ is a saturation electrical filed of the semiconductor material.

9. The optical modulator of claim 8 wherein the semiconductor material comprises silicon, and wherein the width l is equal or smaller than 1.4 µm.

10. The optical modulator of claim 8, wherein the electrical circuit comprises a high-voltage terminal, a low voltage terminal, and a bias control terminal, wherein the first bias tuner is electrically connected between the high-voltage terminal and the bias control terminal, and the second bias tuner is electrically connected between the bias control terminal and the low-voltage terminal, so as to effect the push-pull dither of the bias setting of the first MZM with a common bias dither signal applied to the bias control terminal.

11. An optical modulator system comprising:
a first Mach-Zehnder modulator (MZM) comprising first and second waveguide arms formed in a semiconductor material;
one or more signal electrodes coupled to the first and second waveguide arms to effect signal modulation of output light of the first MZM;
a first bias tuner coupled to the first waveguide arm and configured to tune a bias of the first MZM by tuning a refractive index in the first waveguide arm;
a second bias tuner coupled to the second waveguide arm and configured to tune the bias of the first MZM by tuning a refractive index in the second waveguide arm; and
a control circuit configured to:
provide a bias signal to the first and second bias tuners,
apply a push-pull dither signal to the one or more signal electrodes or the first and second bias tuners so as to effect push-pull dithering of the bias of the first MZM,
detect a signature of the push-pull dither signal in an optical signal downstream of the first MZM to provide a dither feedback signal, and
tune the bias signal in dependence on the dither feedback signal;
wherein the control circuit is configured to provide the push-pull dither signal to the first and second bias tuners; and
wherein the control circuit comprises a high-voltage terminal, a low voltage terminal, and a bias control terminal, wherein the first bias tuner is electrically connected between the high-voltage terminal and the bias control terminal, and the second bias tuner is electrically connected between the bias control terminal and the low-voltage terminal, so as to effect a push-pull dither of the bias of the first MZM with a common bias dither signal applied to the bias control terminal.

12. The optical modulator system of claim 11 wherein the control circuit is configured to provide the push-pull dither signal to the one or more signal electrodes.

13. The optical modulator system of claim 11 further comprising a second MZM connected optically in parallel with the first MZM to form an optical IQ modulator, wherein the control circuit comprises:
a photodetector disposed to receive light from an output of the optical IQ modulator and to provide an electrical PD signal, and
a dither detector circuit configured to detect the signature of the push-pull dither signal in the electrical PD signal, or a signal related thereto.

14. A method for controlling an optical modulator circuit comprising a Mach-Zehnder modulator (MZM), the MZM comprising first and second waveguide arms formed in a semiconductor material, one or more signal electrodes coupled to the first and second waveguide arms to effect signal modulation of output light of the MZM; a first bias tuner coupled to the first waveguide arm; a second bias tuner coupled to the second waveguide arm; and a control circuit; the method comprising:
applying a bias dither signal to the first and second waveguide arms in a push-pull manner so as to dither a refractive index in the first and second waveguide arms of the MZM in counter-phase;
detecting a signature of the bias dither signal in an output optical signal of the optical modulator; and,
tuning a bias setting of the MZM in dependence on the detected signature of the dither signal;
wherein the control circuit comprises a high-voltage terminal, a low voltage terminal, and a bias control terminal, wherein the first bias tuner is electrically connected between the high-voltage terminal and the bias control terminal, and the second bias tuner is electrically connected between the bias control terminal and the low-voltage terminal, to effect a push-pull dither of the bias setting of the MZM with a common bias dither signal applied to the bias control terminal.

* * * * *